(12) United States Patent
Nakano

(10) Patent No.: US 8,166,729 B2
(45) Date of Patent: May 1, 2012

(54) LIGHT SOURCE DEVICE AND PROJECTOR

(75) Inventor: Kiyotaka Nakano, Azumino (JP)

(73) Assignee: Seiko Epson Corporation, Tokyo (JP)

( * ) Notice: Subject to any disclaimer, the term of this patent is extended or adjusted under 35 U.S.C. 154(b) by 344 days.

(21) Appl. No.: 12/508,021

(22) Filed: Jul. 23, 2009

(65) Prior Publication Data

US 2010/0026966 A1 Feb. 4, 2010

(30) Foreign Application Priority Data

Jul. 31, 2008 (JP) ................................. 2008-198627

(51) Int. Cl.
*G03B 21/18* (2006.01)

(52) U.S. Cl. .............. 53/57; 353/61; 362/294; 362/264; 362/345

(58) Field of Classification Search .............. 353/52–61; 362/94, 294, 218, 264, 345, 37, 547; 313/113, 313/318.11
See application file for complete search history.

(56) References Cited

U.S. PATENT DOCUMENTS

| 6,139,154 | A * | 10/2000 | Haba ................................. 353/31 |
| 6,742,899 | B1 * | 6/2004 | Wu et al. .......................... 353/61 |
| 6,793,343 | B2 | 9/2004 | Nakano et al. |
| 6,832,837 | B2 * | 12/2004 | Suzuki et al. .................... 353/61 |
| 6,846,096 | B2 * | 1/2005 | Hsu et al. ....................... 362/294 |
| 7,188,973 | B2 | 3/2007 | Katsuma |
| 7,510,285 | B2 * | 3/2009 | Takemi et al. .................. 353/61 |
| 7,607,781 | B2 * | 10/2009 | Yun et al. ......................... 353/55 |
| 7,862,186 | B2 * | 1/2011 | Hamada ......................... 353/119 |
| 2001/0021006 | A1 * | 9/2001 | Shimizu ........................... 353/57 |
| 2002/0015119 | A1 * | 2/2002 | Takizawa ......................... 349/58 |
| 2004/0145896 | A1 * | 7/2004 | Watanabe et al. ............. 362/294 |
| 2004/0228130 | A1 * | 11/2004 | Kato et al. ..................... 362/294 |
| 2007/0146645 | A1 * | 6/2007 | Lin et al. ......................... 353/58 |

FOREIGN PATENT DOCUMENTS

| JP | 2002-189247 A | 7/2002 |
| JP | 2002-298639 A | 10/2002 |
| JP | 2003-215711 A | 7/2003 |
| JP | 2005-10505 A | 1/2005 |
| JP | 2005-249930 A | 9/2005 |
| JP | 2006-91132 A | 4/2006 |
| JP | 2006-106656 A | 4/2006 |
| JP | 2006-243635 A | 9/2006 |
| JP | 2007-333915 A | 12/2007 |
| JP | 2008-152970 A | 7/2008 |

* cited by examiner

*Primary Examiner* — William C Dowling
*Assistant Examiner* — Sultan Chowdhury
(74) *Attorney, Agent, or Firm* — AdvantEdge Law Group, LLC

(57) ABSTRACT

A light source device includes: a light source lamp; and a housing, wherein the housing includes: a pair of openings formed, along a top and bottom with direction of a luminous flux emission of the light source device; a duct member provided so as to cover the pair of openings, and having an intake which outside air is introduced from the pair of openings to an air flow channel upstream side; a first air flow guide member provided inside the duct member, and causing the air introduced from the intake to circulate to either one of the pair of openings via the duct member by pivots under its own weight; and a second air flow guide members provided in positions in the housing corresponding to the openings, and causing the air introduced from the openings to circulate toward the light source lamp.

8 Claims, 16 Drawing Sheets

LIGHT SOURCE DEVICE AND PROJECTOR

CROSS REFERENCE TO RELATED APPLICATIONS

The present application claims priority from Japanese Patent Application No. 2008-198627 filed on Jul. 31, 2008, which is hereby incorporated by reference in its entirety.

BACKGROUND

1. Technical Field

The present invention relates to a light source device and a projector.

2. Related Art

To date, a light source device, and a projector which modulates a luminous flux emitted from the light source device, forms an image light according to image information, and enlarges and projects the image light onto a projection surface of a screen or the like, have been known. It often being the case that a discharge light source lamp, such as an ultra-high pressure mercury-vapor lamp, is adopted for this kind of light source device, the light source lamp reaches a high temperature condition when emitting light. In the event that this kind of high temperature condition continues, as the light source lamp is likely to deteriorate, there is a need to cool the light source lamp. Arising from this kind of need, a projector has been known which sends cooling air to the light source lamp, cooling the light source device (refer to, for example, JP-A-2003-215711).

With the projector described in JP-A-2003-215711, a plurality of cooling fans are disposed inside an exterior casing in which is formed an intake for taking in cooling air from outside. A panel cooling system, which mainly cools liquid crystal panels and the like which form an image light, a light source cooling system, which mainly cools a light source device, and a power supply cooling system, which mainly cools a power supply device which supplies power to each electronic part, are formed inside the projector by the cooling fans. Among these, with the light source cooling system, cooling air taken in from the intake by a fan disposed below the power supply device, by being guided by a guide provided inside the exterior casing, enters the inside of the light source device, and cools the light source lamp. Then, the cooling air is taken in and out of the light source device by another fan, and discharged from an outlet formed in the exterior casing. According to this kind of configuration, it being possible to cool the light source lamp, it is possible to suppress a deterioration of the light source lamp.

Meanwhile, this kind of projector is utilized in a normal position in which it is mounted on an installation surface of, for example, a desk or the like, and in a suspended position in which it is fixed to a ceiling or the like in such a way as to be an inversion of the normal position, but a place in which heated air inside the projector is accumulated differs between the normal position and the suspended position. For this reason, in the event that the flow of cooling air is set in advance as with the previously described projector described in JP-A-2003-215711, it may happen that it is impossible to appropriately cool the light source device in either the normal position or the suspended position. In response to this kind of case, it is conceivable to increase the rotation speed (revolutions per hour) of the fans in the normal position and the suspended position, but there is a problem in that a detection unit which detects a position of the projector is required, and so on, complicating the configuration of the projector and the drive control of the fans. For this reason, a structure has been demanded in which it is possible to stably cool the light source lamp with a simple configuration.

SUMMARY

An advantage of some aspects of the invention is to provide a light source device, and a projector, which can stably cool a light source lamp with a simple configuration.

A light source device according to an aspect of the invention includes a light source lamp configured to emits light, and a housing which accommodates therein the light source lamp. The housing includes a pair of openings formed, along a top and bottom with direction of a luminous flux emission of the light source device; a duct member provided so as to cover the pair of openings, and having an intake which outside air is introduced from the pair of openings to an air flow channel upstream side; a first air flow guide member provided inside the duct member, causing the air introduced from the intake to circulate to either one of the pair of openings via the duct member pivots under its own weight; and a second air flow guide members provided in positions in the housing corresponding to the openings, and causing the air introduced from the openings to circulate toward the light source lamp.

As this kind of light source lamp, it is possible to exemplify with a discharge type light source lamp including an approximately spherical light emitting section, inside which a pair of electrodes are disposed, and a discharge space within which is enclosed a light emitting material is formed, a light emitting tube, which has a pair of sealing sections extending from either extremity of the light emitting section in mutually opposing directions, and a reflecting mirror, in an approximate center of the reflecting surface of which is formed an opening through which one of the pair of sealing sections is inserted.

According to the aspect of the invention, the first air flow guide member inside the duct member provided so as to cover the pair of openings pivots under its own weight, and switches a flow channel of air (cooling air) for cooling the light source lamp so as to cause the air to circulate to one of the pair of openings. According to this configuration, it is possible to cause the cooling air to circulate to the opening positioned on the upper side, or the opening positioned on the lower side, either when the light source device is installed in such a way that one opening, among the pair of openings formed in a second direction, is positioned on the upper side, and the other opening positioned on the lower side, or when the light source device is installed in such a way that the other opening is positioned on the upper side, and the one opening positioned on the lower side. Also, as this kind of first air flow guide member switches the flow channel of cooling air under its own weight, it is unnecessary to provide a detection unit which detects an installation position of the light source device, and a pivoting unit such as a motor which pivots the air flow guide member in accordance with the position detected. Consequently, as it is possible to constantly cause the air to circulate to the upper or lower opening, and send the cooling air to the light source lamp from above or below, even when the light source device is in either installation position, it is possible to efficiently cool the light source lamp with a simple configuration.

According to the aspect of the invention, it is preferable that the first air flow guide member leads the air introduced from the intake to the pair of openings, which positioned on the upper side.

Herein, the upper side of the light source lamp being more likely to be heated by light emission in comparison with the lower side, a difference in temperature occurs between the upper side and lower side. This kind of local difference in temperature causes a deterioration such as a white turbidity or deformation of glass configuring the light source lamp, causing a shorter life of the light source lamp. In response to this, with the aspect of the invention, as the first air flow guide member leads the air to the opening positioned on the upper side, it is possible to send the cooling air to the light source lamp from above. Consequently, it is possible to efficiently cool the upper side of the light source lamp, and thus suppress a deterioration of the light source lamp.

According to the aspect of the invention, it is preferable that the housing includes an outlet formed on the side opposite from the pair of openings across the light source lamp, and discharges an air which has cooled the light source lamp, and the center of outlet provided on a virtual straight line along a perpendicular to the luminous flux emission direction which passes through an approximate center of a virtual straight line connecting the centers of the pair of openings.

According to the aspect of the invention, as the outlet is formed on the side opposite from the pair of openings across the light source lamp, the cooling air which cools the light source lamp, after being sent to the light source lamp, circulates to the side opposite from the openings, and is discharged from the outlet. Consequently, it is possible to reliably send the cooling air to the light source lamp. Also, as the outlet has its center on the virtual straight line along a perpendicular to the luminous flux emission direction which, passing through the approximate center of the virtual straight line connecting the centers of the pair of openings, is parallel to the first direction, the flow channel lengths of the cooling air from the openings to the outlet are approximately the same whichever opening is utilized. Consequently, it is possible to send the cooling air to the light source lamp in the same way whichever opening, among the pair of openings, is positioned on the upper side.

Herein, in the event that the opening surface of each opening and the light source lamp do not face each other, there is a possibility that the cooling air introduced from the openings is not appropriately sent to the light source lamp.

In response to this, in the aspect of the invention, as the cooling air introduced from the openings circulates toward the light source lamp by means of the second air flow guide members provided inside the housing, it is possible to reliably and appropriately send the cooling air to the light source lamp. Consequently, it is possible to more efficiently cool the light source lamp.

According to the aspect of the invention, it is preferable that the second air flow guide members provided along the inner surface of the housing, have a light shielding effect which shields incoming light on the inner surface among the light emitted from the light source lamp.

Herein, in the event that the housing is formed of a synthetic resin containing a glass filler, when light, including an ultraviolet ray, emitted from the light source lamp is applied to the housing, it may happen that the synthetic resin is degraded, and the separated glass filler adheres to the light source lamp. In this case, the use efficiency of the light emitted from the light source lamp decreases.

In response to this, with the aspect of the invention, by the metallic light shielding member being provided along the inner surface of the housing, it is possible to suppress a deterioration of the housing. Consequently, as well as it being possible to suppress the reduction in the use efficiency of the light emitted from the light source lamp, it is possible to improve the degree of freedom in selecting a material of the housing. Also, by the second air flow guide members provided in this kind of light shielding member, it is possible to integrally form the second air flow guide members and light shielding member. Consequently, it is possible to suppress an unnecessary increase in the number of parts of the light source device.

A projector according to another aspect of the invention includes the previously described light source device, a light modulation device configured to modulates a luminous flux emitted from the light source device, and a projection optical device configured to projects the modulated luminous flux.

According to the aspect of the invention, it is possible to obtain the same advantages as those of the previously described light source device. Also, as it is possible to efficiently cool the light source lamp, it is possible to suppress a shorter life of the light source device. Consequently, it being possible to reduce the frequency of replacement of the light source device, it is possible to eliminate the trouble of maintaining the projector.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereafter, a description will be given, based on the drawings, of one embodiment of the invention.

External Configuration of Projector

Figure 1:
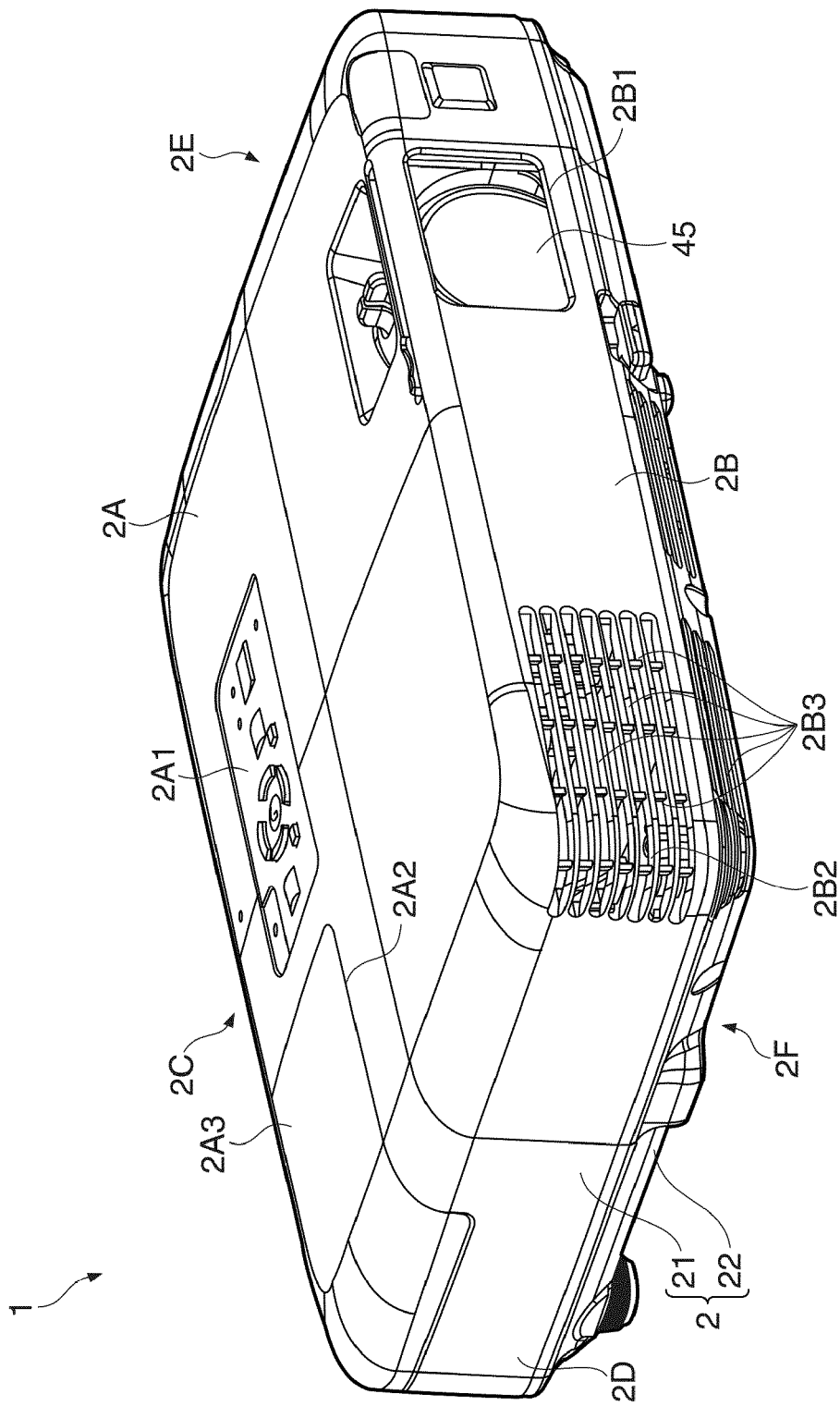
FIG. 1 is a perspective view of a projector according to one embodiment of the invention, as seen from the front side.

FIG. 1 is a perspective view of a projector 1 according to the embodiment, as seen from a front side.

The projector 1 according to the embodiment modulates a luminous flux emitted from a light source device, forms an image light according to image information, and enlarges and projects the image light onto a projection surface (not shown), such as a screen. As shown in FIG. 1, the projector 1 includes an exterior casing 2 configuring the exterior.

The exterior casing 2 is a casing which, being made of a synthetic resin, accommodates therein an apparatus main body 3 (refer to FIG. 2) of the projector 1. The exterior casing 2 is configured combining an upper casing 21 which configures a top surface 2A, a front surface 2B, a back surface 2C, and both left and right side surfaces 2D and 2E, of the projector 1, and a lower casing 22 which configures a bottom surface 2F, the front surface 2B, the back surface 2C, and the two side surfaces 2D and 2E, of the projector 1.

An operation panel 2A1 on which are disposed a plurality of keys for operating the projector 1 is provided in an approximate center of the top surface 2A on the back surface side, and an opening 2A2 for replacing the light source device 5, to be described hereafter, is formed to the left side (the left side in FIG. 1) of the operation panel 2A1. The opening 2A2 is closed by a cover 2A3 removably provided on the top surface 2A.

An approximately rectangular opening 2B1 through which is exposed a projection optical device 45, to be described hereafter, being formed on the right side (the right side in FIG. 1) of the front surface 2B, an image light is projected from the projection optical device 45 through the opening 2B1.

An outlet 2B2 from which cooling air which has cooled the apparatus main body 3 is discharged being formed on the left side of the front surface 2B, a grid like louver 2B3 is provided in the outlet 2B2.

Internal Configuration of Projector

Figure 2:
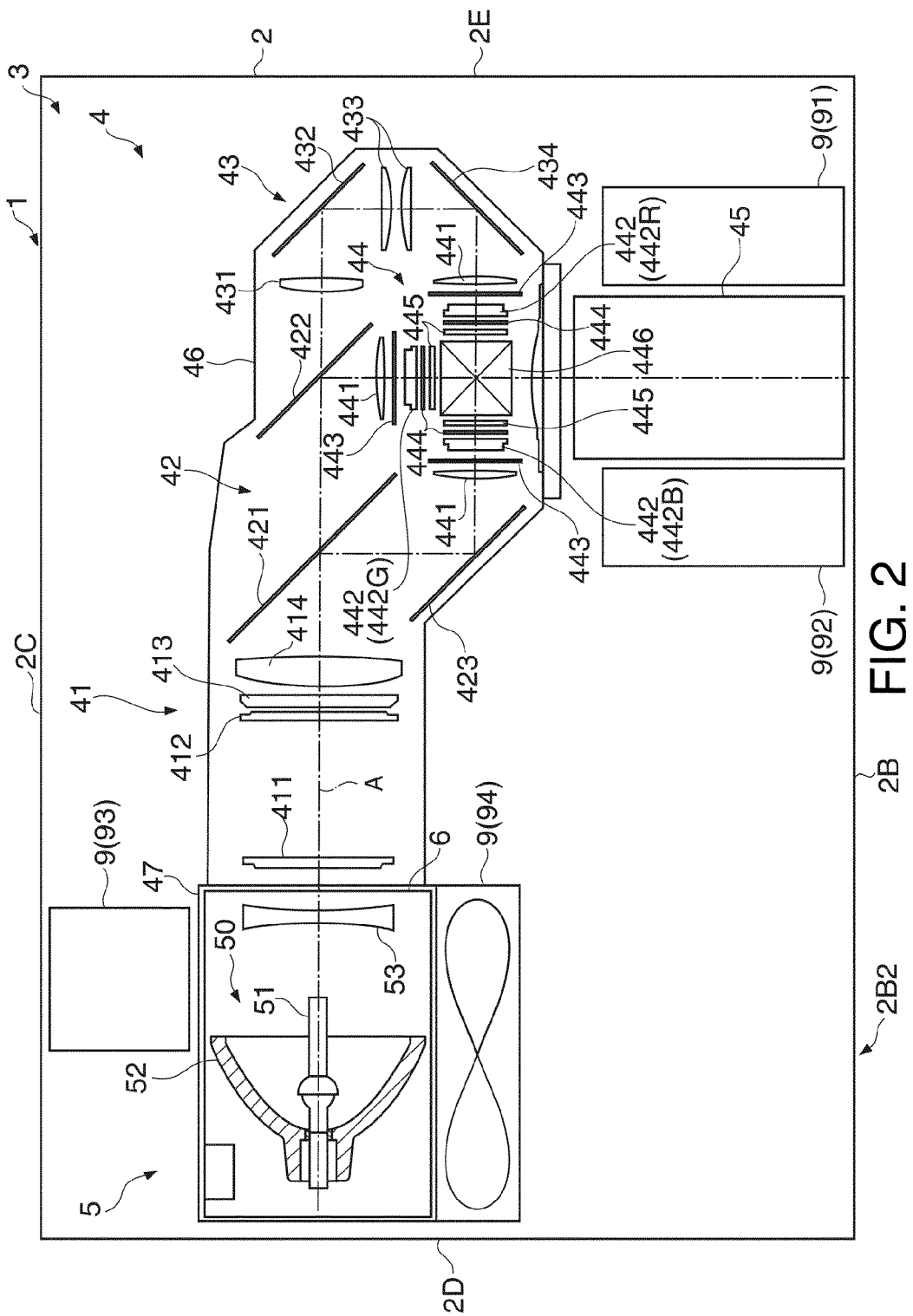
FIG. 2 is a schematic diagram showing a configuration of an apparatus main body in the embodiment.

FIG. 2 is a schematic diagram showing a configuration of the apparatus main body 3.

As shown in FIG. 2, the apparatus main body 3 includes an optical unit 4 and a cooling device 9. Also, the apparatus main body 3 includes, although not shown, a power supply device, which supplies power to each component member of the projector 1, a control device, which controls an operation of each component member of the projector 1, and the like.

Among these, the cooling device 9, being configured of a plurality of fans 91 to 94, sends air introduced from outside the exterior casing 2 to the optical unit 4, power supply device, and control device, cooling each of them. A pair of fans 91 and 92, among the fans 91 to 94, disposed in such a way as to sandwich the projection optical device 45, to be described hereafter, being configured of sirocco fans, introduce outside cooling air through an intake (not shown) formed in the exterior casing 2, and send the cooling air to liquid crystal panels 442 and polarizing plates 443 and 445, to be described hereafter, of the optical unit 4.

Also, among a pair of fans 93 and 94 disposed in such a way as to sandwich a light source housing member 47, to be described hereafter, the fan 93 positioned on the back surface 2C side of the projector 1, being configured of a sirocco fan, takes in air inside the exterior casing 2, and sends the air to the light source device 5 accommodated in the light source housing member 47, to be described hereafter. Also, the fan 94, being configured of an axial flow fan, is disposed in such a way as to cause the air intake surface to face the light source housing member 47. Then, the fan 94 takes in air which has cooled the light source device 5 inside the light source housing member 47, and discharges the air toward the front surface 2B of the projector 1, and furthermore, discharges the air to the outside of the exterior casing 2 through the previously described outlet 2B2. It is also acceptable that the fan 93 is an axial flow fan, and it is also acceptable that the fan 94 is a sirocco fan.

Configuration of Optical Unit

Under the control of the previously described control device, the optical unit 4 forms an image light in accordance with the image information. The optical unit 4 includes the light source device 5, an illumination optical device 41, a color separation optical device 42, a relay optical device 43, an optical device 44, the projection optical device 45, a parts housing member 46, and the light source housing section 47.

The light source device 5, as well as including a light source lamp 50 having a light emitting tube 51 and a reflecting mirror 52, and a collimating concave lens 53, includes a housing 6 which accommodates them therein. Among these, the reflecting mirror 52, having a reflecting surface 521 (refer to FIG. 14) formed in an approximately concave shape in cross-section, reflects one portion of light, emitted from the light emitting tube 51 disposed in an approximate center of the reflecting surface 521, by means of the reflecting surface 521, and emits it as a luminous flux. This kind of reflecting mirror 52 is formed as a cold mirror which reflects visible light, and transmits an infrared ray and an ultraviolet ray. The configurations of the light source lamp 50 and housing 6 will be described in detail hereafter.

The illumination optical device 41 includes a pair of lens arrays 411 and 412, a polarization conversion element 413, and a superimposing lens 414.

The color separation optical device 42 includes dichroic mirrors 421 and 422, and a reflecting mirror 423, and the relay optical device 43 includes an incoming side lens 431, relay lenses 433, and reflecting mirrors 432 and 434.

The optical device 44 includes field lenses 441, three liquid crystal panels 442 (a red light liquid crystal panel is indicated by 442R, a green light liquid crystal panel by 442G, and a blue light liquid crystal panel by 442B) acting as optical modulation devices, three incoming side polarizing plates 443, three viewing angle compensating plates 444, three exiting side polarizing plates 445, and a cross dichroic prism 446 acting as a color synthesis optical device. The projection optical device 45, being configured as an achromatic lens having a plurality of lenses accommodated in a tubular lens tube, enlarges and projects an image light formed by the optical device 44 onto the projection surface.

The parts housing member 46 is a box like casing which, being formed in an approximate L shape in a plan view, accommodates therein each heretofore described optical device 41 to 44. The optical devices 41 to 44, being accommodated in the parts housing member 46, are disposed in predetermined positions relative to an illumination optical axis A set inside.

The light source housing member 47, being connected to one extremity of the parts housing member 46, accommodates therein the light source device 5. A disposition position of the light source housing member 47 inside the exterior casing 2 is a position corresponding to the previously described opening 2B1.

With this kind of optical unit 4, according to the heretofore described configuration, the luminous flux emitted from the light source device 5, after the illuminance thereof in an illumination region is homogenized by the illumination optical device 41, is separated into three color lights, R (red), G (green), and B (blue), by the color separation optical device 42. The color lights separated are each modulated in accordance with the image information by the respective liquid crystal panels 442, forming one image light for each color light. Then, the one image light for each color light is synthesized by the cross dichroic prism 446, and projected, enlarged, onto the projection surface by the projection optical device 45.

Configuration of Light Source Device

Figure 3:
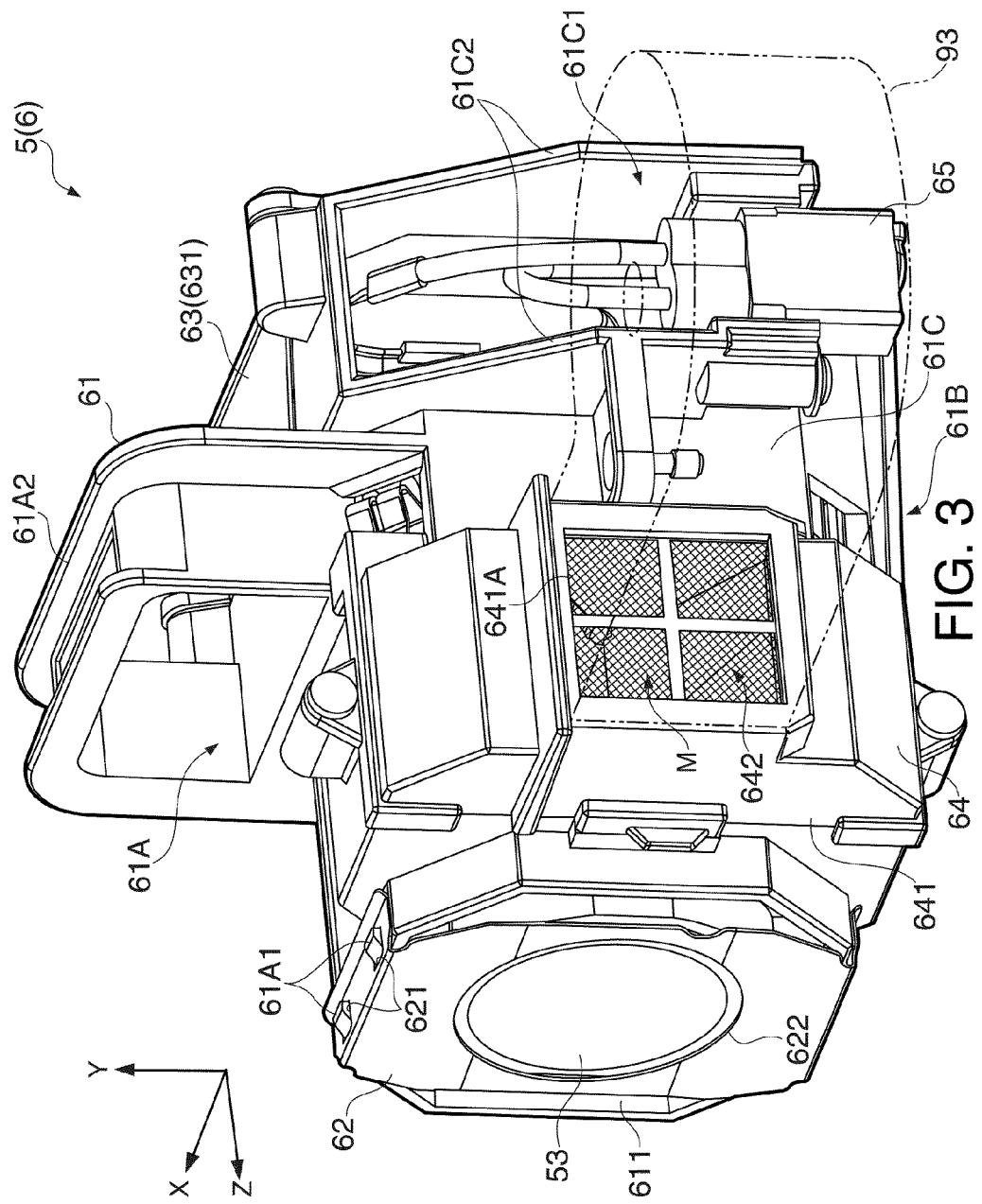
FIG. 3 is a perspective view showing a light source device in the embodiment.
Figure 4:
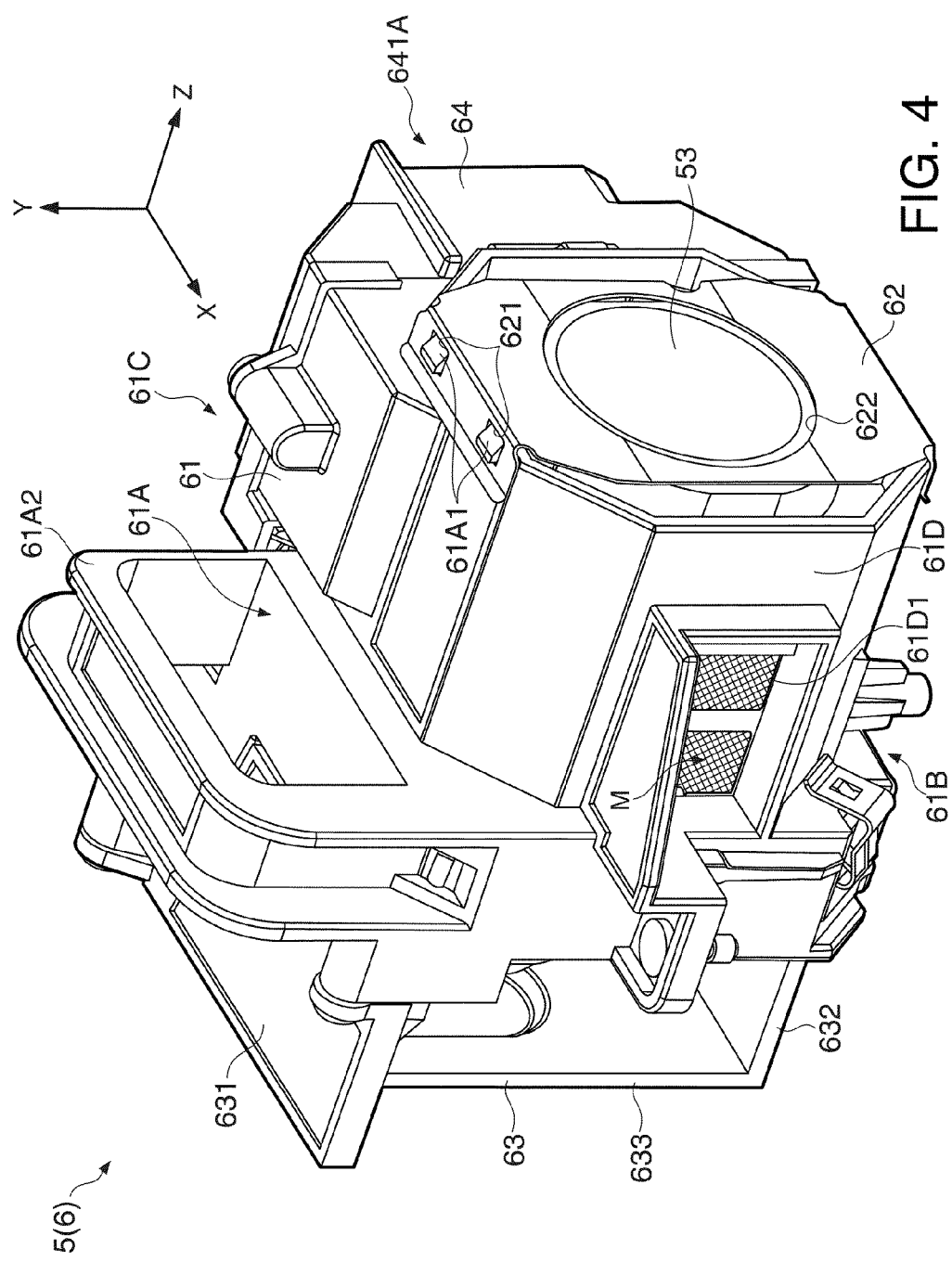
FIG. 4 is a perspective view showing the light source device in the embodiment.
Figure 5:
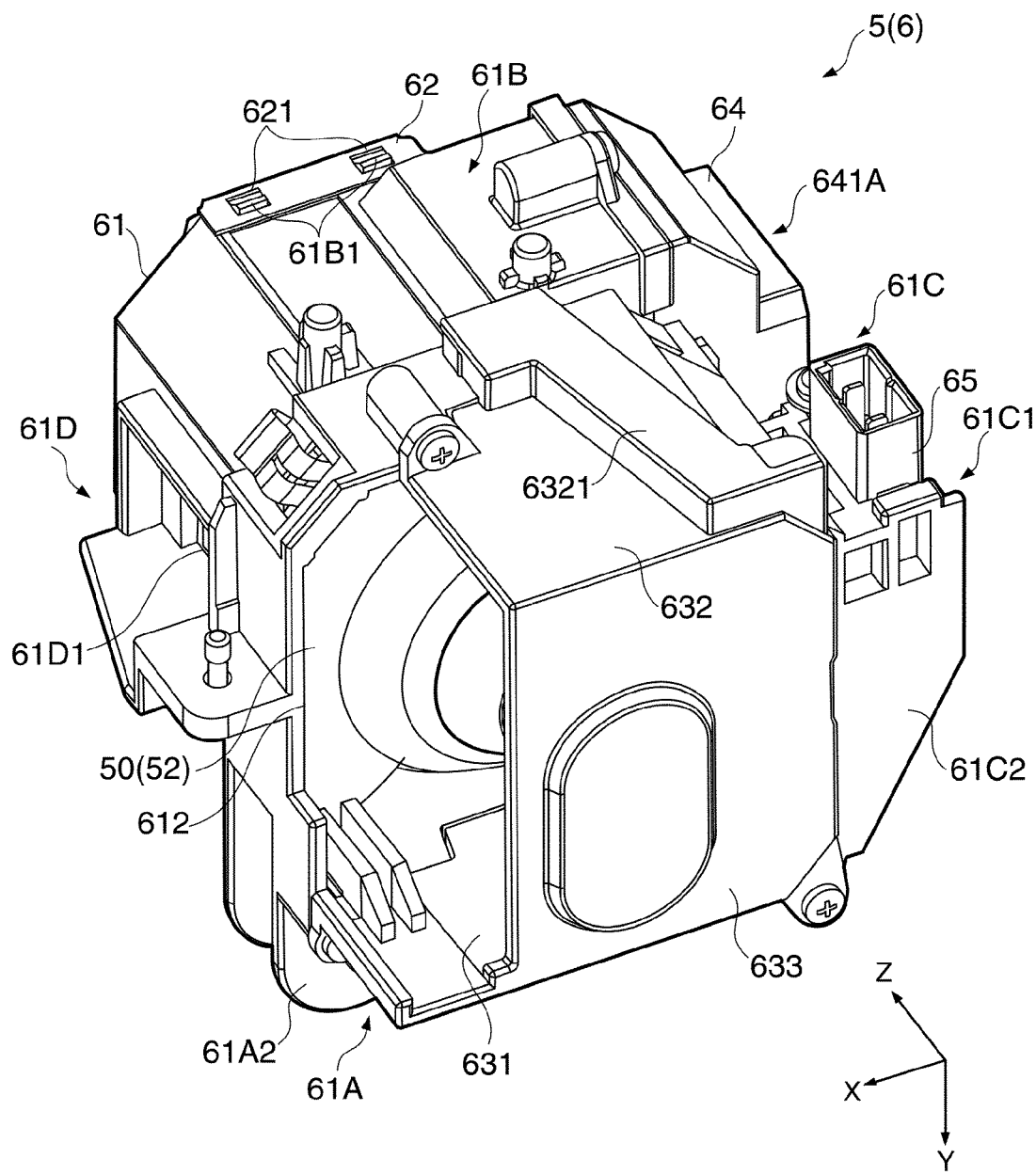
FIG. 5 is a perspective view showing the light source device in the embodiment.

FIGS. 3 to 5 are perspective views showing the light source device 5. Specifically, FIGS. 3 and 4 are perspective views of the light source device 5, as seen from the right and left sides, when looking toward the light source device 5 from a leading extremity side thereof in the direction of luminous flux emission, while FIG. 5 is a perspective view of the light source device 5, as seen from below a proximal extremity side thereof in the direction of luminous flux emission. In the drawings and descriptions below, when the projector 1 is mounted on a horizontal plane, the direction of luminous flux emission of the light source device 5 (specifically, the reflecting mirror 52, to be described hereafter), which is a direction parallel to a horizontal direction, is taken to be a Z direction. Also, a direction, among directions perpendicular to the Z direction, which is parallel to a horizontal direction, and rightward relative to the Z direction when seen from the Z direction proximal side, is taken to be an X direction (a first direction in the embodiment of the invention), and an upward direction perpendicular to the Z direction and X direction is taken to be a Y direction (a second direction in the embodiment of the invention). That is, the directions indicated by X, Y, and Z are perpendicular to each other.

As previously described, the light source device 5 is configured as a unit which includes the light source lamp 50 having the light emitting tube 51 and reflecting mirror 52, the collimating concave lens 53 (for all of which refer to FIG. 2), and the housing 6 which accommodates them.

Among these, the housing 6, as shown in FIGS. 3 to 5, includes a housing main body 61, a first cover 62, which covers the Z direction leading extremity side of the housing main body 61, a second cover 63, which covers the Z direction proximal extremity thereof, a duct member 64, which introduces cooling air into the housing main body 61, and an apparatus side connector 64, which is connected to a main body side connector (not shown) provided inside the light source housing member 47.

Configuration of First Cover

As shown in FIGS. 3 and 4, the first cover 62, being a metallic member having an approximate C shape in a side view, closes a recessed section 611 formed on the Z direction leading extremity side of the housing main body 61. An approximately circular light transmission opening 6111 (refer to FIGS. 10 and 11), through which is transmitted the luminous flux from the light source lamp 50 accommodated inside the housing main body 61, being formed in an approximate center of the recessed section 611, the light transmission opening 6111 is closed by a collimating concave lens 53 held on the first cover 62. Approximately rectangular apertures 621 are formed in a pair of mutually opposed surfaces of the first cover 62. By latching pawls 61A1 and 61B1 (regarding the latching pawl 61B1, refer to FIG. 5), formed at the Z direction leading extremity side extremities of Y direction leading extremity side and proximal extremity side extremity surfaces (upper surface and lower surface) 61A and 61B of the housing main body 61, being fitted into these apertures 621, the first cover 62 is latched by the housing main body 61. Also, an opening 622 through which is exposed the collimating lens 53 is formed in an approximate center of an extremity surface (a Z direction leading extremity side extremity surface) which connects the pair of surfaces.

Configuration of Second Cover

As shown in FIGS. 3 to 5, the second cover 63 is attached to the housing main body 61 with a screw in such a way as to cover the Z direction proximal extremity side of the housing main body 61. The second cover 63 has an approximate C shape in a side view including extending sections 631 (FIG. 3) and 632 (FIG. 5) which extend along the respective extremity surfaces 61A (FIG. 3) and 61B (FIG. 5) of the housing main body 61, and a connecting section 633 which connects the Z direction proximal extremity side extremities of the extending sections 631 and 632. The ultraviolet ray and infrared ray transmitted through the reflecting mirror 52 are shielded by this kind of second cover 63.

As shown in FIG. 5, a cover section 6321 which covers a cable housing section 61B3 (refer to FIG. 6), to be described hereafter, formed on the extremity surface 61B is formed on the extending section 632, between the extending sections 631 and 632. The cover section 6321 is formed in the Z direction so as to correspond to the cable housing section 61B3. The cable housing section 61B3 will be described in detail hereafter.

Configuration of Housing Main Body

The housing main body 61 is a tubular body made of a synthetic resin containing a glass filler, in which is formed a lamp housing section 613 (refer to FIGS. 10 and 11) inside which the Z direction leading extremity side of the light source lamp 50 is disposed and accommodated. The previously described recessed section 611 is formed on the Z direction leading extremity side of the housing main body 61. Furthermore, an opening 612 being formed on the Z direction proximal extremity side of the housing main body 61, the opening 612 is closed by the reflecting mirror 52.

The previously described latching pawls 61A1 are formed on the Z direction leading extremity side of the Y direction leading extremity side extremity surface 61A of the housing main body 61, and an approximately U shaped handle 61A2, which is used when inserting or removing the light source device 5 into or from the light source housing member 47, is formed in an approximate center of the extremity surface 61A.

Figure 6:
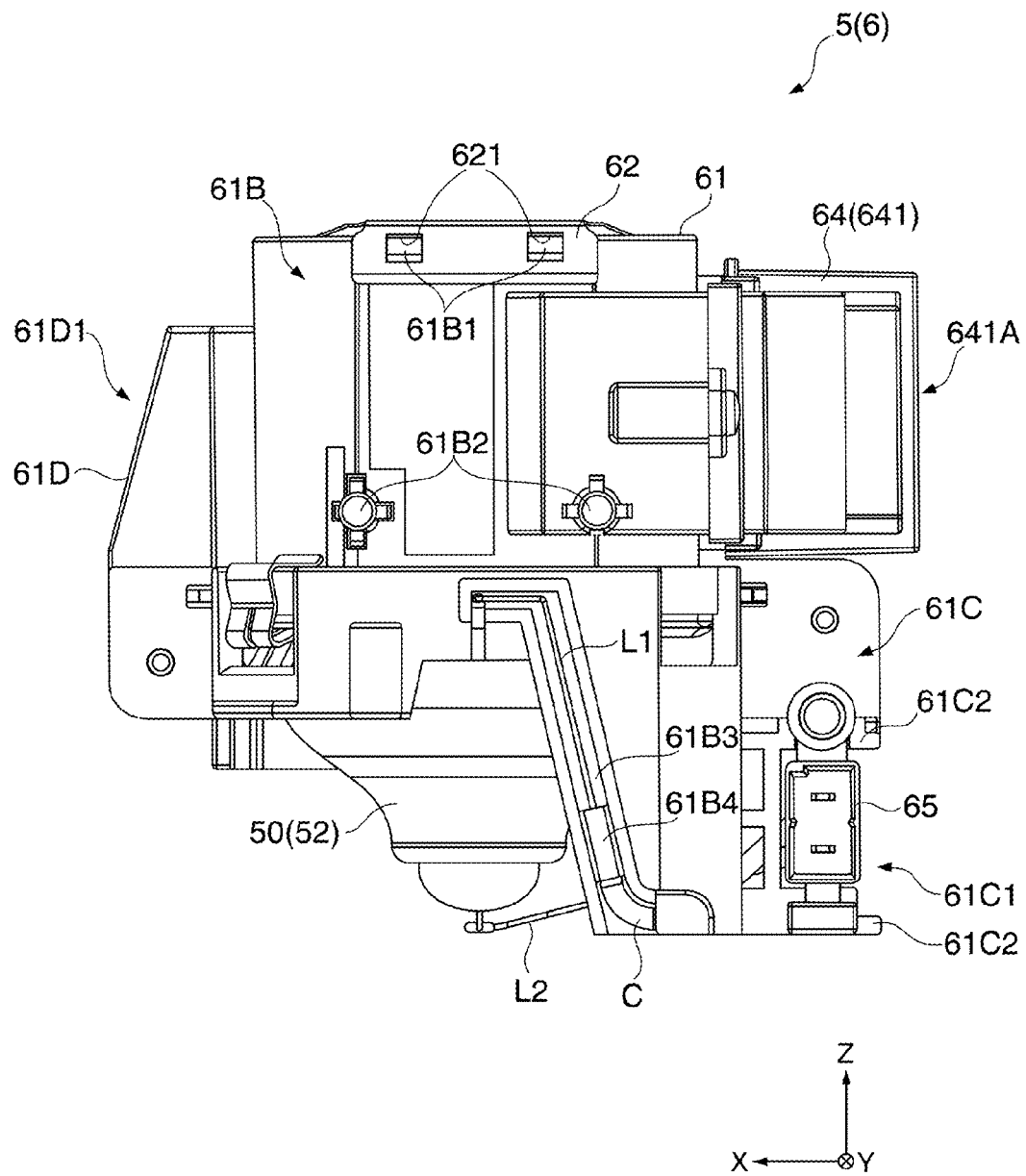
FIG. 6 shows a housing main body in a condition in which a second cover in the embodiment is removed.

FIG. 6 is a bottom view of the housing main body 61 in a condition in which the second cover 63 is removed therefrom, as seen from the Y direction proximal extremity side, that is, from below.

As previously described, the pair of latching pawls 61B1 protruding in an out-of-plane direction from the Y direction proximal extremity side extremity surface 61B of the housing main body 61 is formed on the Z direction leading extremity side of the relevant extremity surface 61B. Also, legs 61B2 which are brought into abutment with the bottom surface of the light source housing member 47 when the light source device 5 is mounted on the light source housing member 47 are protruded from appropriate positions of the extremity surface 61B.

Furthermore, the cable housing section 61B3 in which are accommodated a lead wire L1 extending from the Z direction leading extremity side of the light emitting tube 51, and a cable C connected to the lead wire L1, is formed on the extremity surface 61B. The cable housing section 61B3, being formed in an approximately concave shape in cross-section, extends from an approximate center of the extremity surface 61B in the Z direction toward the proximal extremity side thereof, and a fixing section 61B4 which caulks and fixes the lead wire L1 and cable C is provided in the vicinity of the Z direction proximal extremity side extremity of the cable housing section 61B3. Then, the lead wire L1 and cable C, after being extended to the Z direction proximal side along the cable housing section 61B3, are bent toward the Y direction leading extremity side, and connected to the apparatus side connector 65. Also, a lead wire L2 connected to the Z direction proximal extremity side of the light emitting tube 51, in the same way, after being extended to the Y direction leading extremity side, is connected to the apparatus side connector 65.

By pulling the lead wire L1 and cable C around inside the cable housing section 61B3 in this way, it is possible to fix the lead wire L1 and cable C. Also, by extending them to the Z direction proximal extremity side, it is possible to space the lead wire L1 and cable C away from the light source lamp 50 (more specifically, a light emitting section 511, to be described hereafter, of the light emitting tube 51), and it is possible to reduce an effect of the ultraviolet ray and infrared ray transmitted through the reflecting mirror 52, and suppress a transmission of heat to the lead wire L1 and cable C. Furthermore, by this kind of cable housing section 61B3 being covered with the cover section 6321 of the second cover 63, it is possible to protect the lead wire L1 and cable C.

As shown in FIG. 3, a connector housing section 61C1 which, being of an approximate inverted U shape in a side view, is surrounded by a pair of standing sections 61C2 standing in the out-of-plane direction from the X direction proximal extremity side extremity surface 61C of the housing main body 61, is formed on the Z direction proximal extremity side of the extremity surface 61C. The apparatus side connector 65 is disposed inside the connector housing section 61C1, with the surface thereof connected to the main body side connector (not shown) facing the Y direction proximal extremity side.

Figure 7:
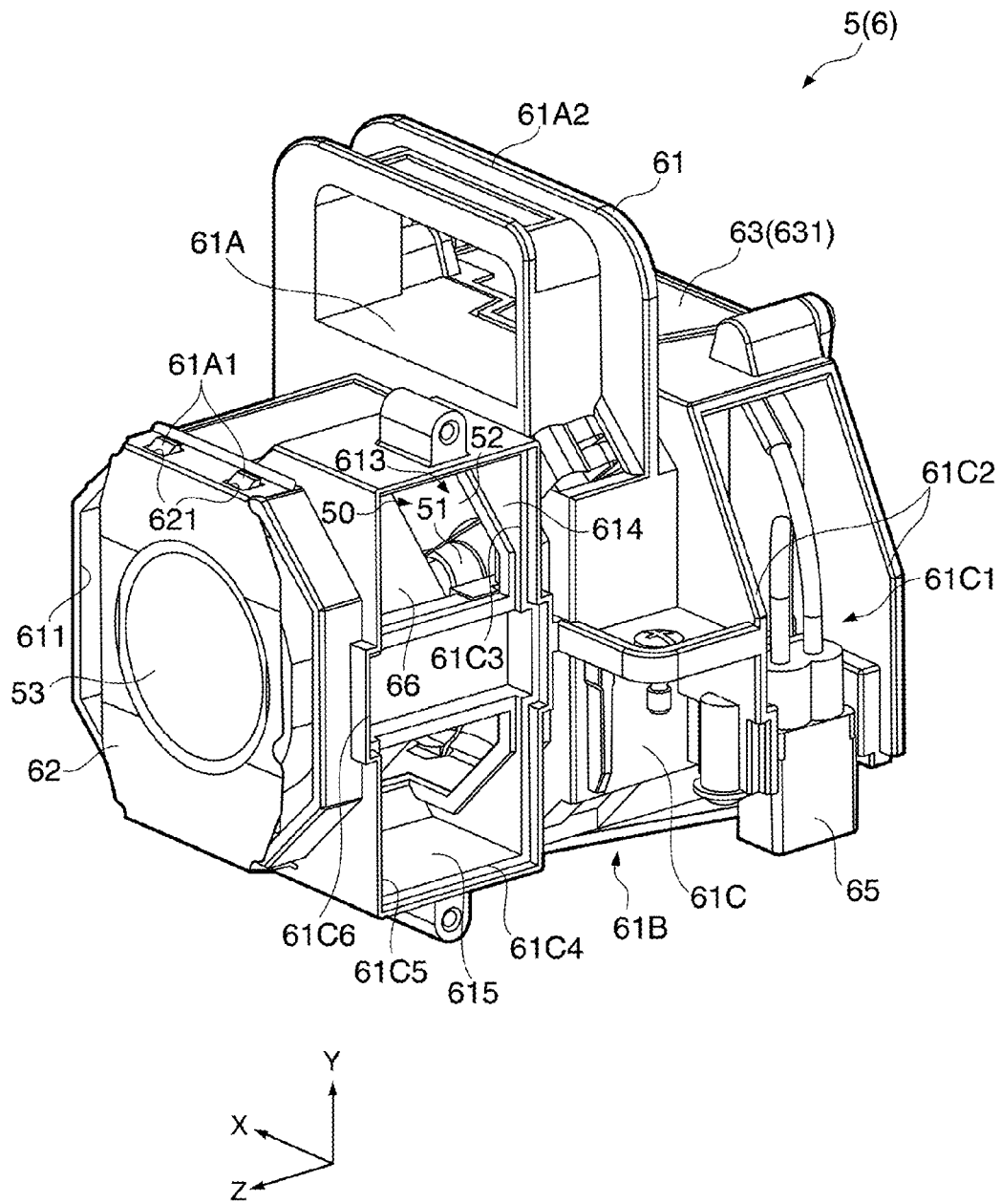
FIG. 7 shows the housing main body in a condition in which a duct member in the embodiment is removed.

FIG. 7 is a perspective view of the housing main body 61 in a condition in which the duct member 64 is removed, as seen from the Z direction leading extremity side.

On the Z direction leading extremity side of the extremity surface 61C, as shown in FIG. 7, approximately rectangular openings 61C3 and 61C4 are formed on the Y direction leading extremity side and proximal extremity side. The openings 61C3 and 61C4, being connected to the lamp housing section 613 (refer to FIGS. 10 and 11) inside the housing main body 61, through duct sections 614 and 615 extending independently in the X direction from the respective opening extremity edges of the openings 61C3 and 61C4, introduce cooling air which cools the light source lamp 50 into the lamp housing section 613. Also, an inwardly recessed section 61C5 being formed in such a way as to surround the extremity edges of the two openings 61C3 and 61C4, the duct member 64 is fitted into the recessed section 61C5. An expanded section 61C6 which is expanded to the Z direction leading extremity side and proximal extremity side being formed in an approximate center of the recessed section 61C5 in the Y direction, the pivot shaft of an air flow guide plate 6425, to be described hereafter, which configures the duct member 64 is positioned in the expanded section 61C6.

Meanwhile, as shown in FIG. 4, an approximately rectangular outlet 61D1 inside which is provided a mesh M is formed in an approximate center of the X direction leading extremity side extremity surface 61D of the housing main body 61. Cooling air which has circulated inside the housing main body 61 is discharged through the outlet 61D1. A formation position of the outlet 61D1, and a flow channel of cooling air, will be described in detail hereafter.

Configuration of Duct Member

Figure 8:
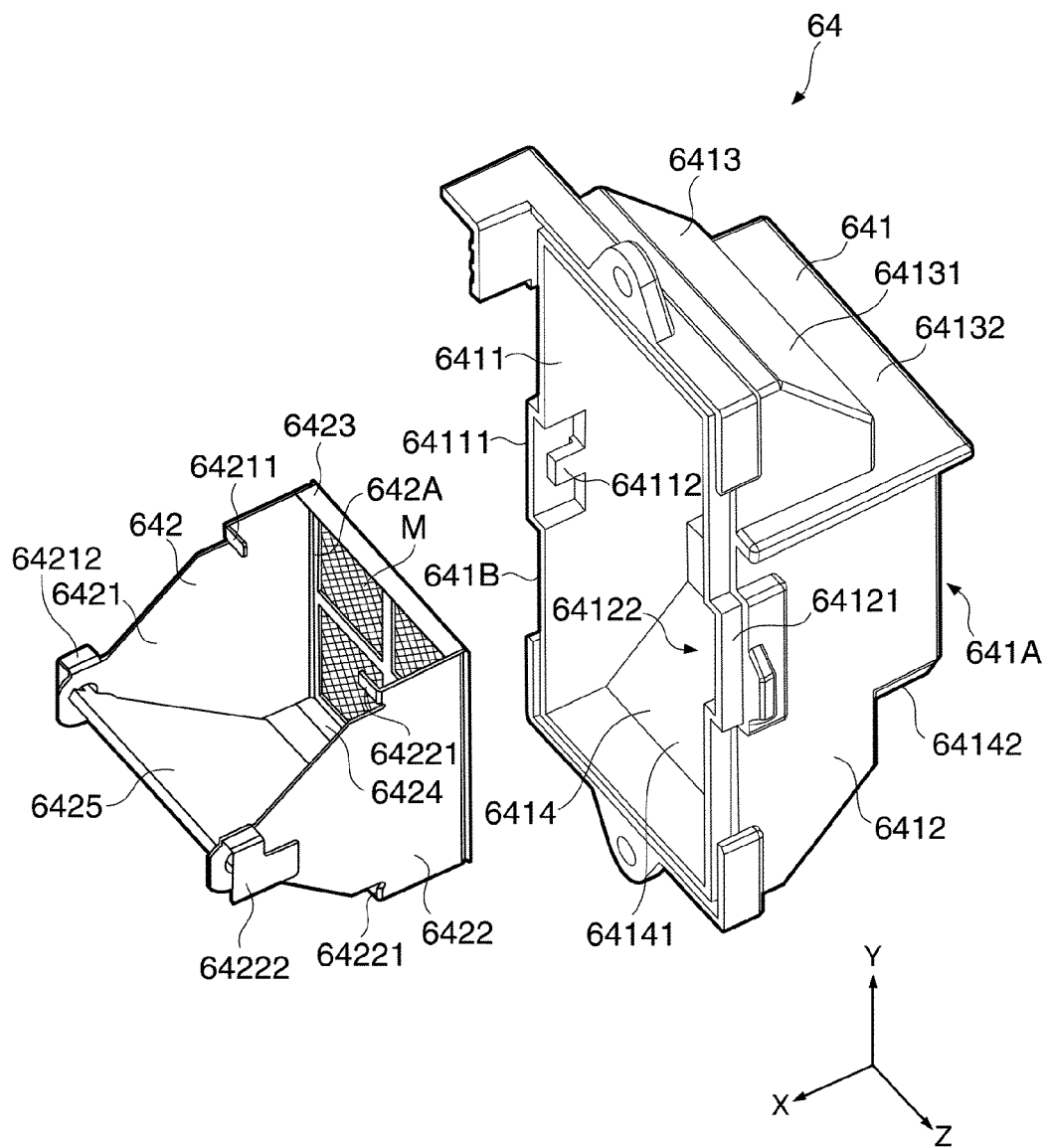
FIG. 8 is an exploded perspective view showing the duct member in the embodiment.
Figure 9:
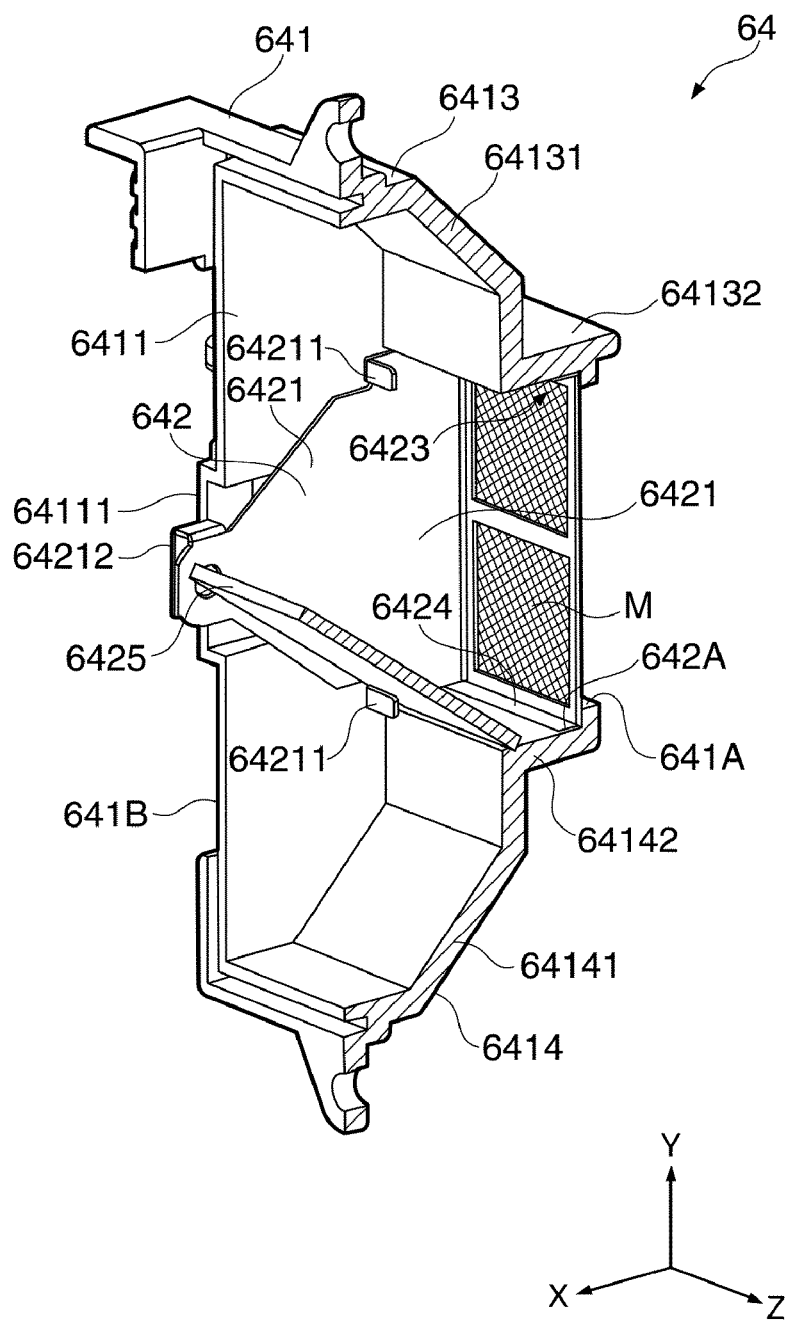
FIG. 9 is a sectional view showing the duct member in the embodiment.

FIGS. 8 and 9 are an exploded perspective view and a sectional view, respectively, showing the duct member 64.

As shown in FIGS. 8 and 9, the duct member 64 is formed so as to be approximately symmetrical about a center thereof in the Y direction. The duct member 64 is attached in such a way as to cover the openings 61C3 and 61C4 (refer to FIG. 7) of the extremity surface 61C, and to be fitted into the recessed section 61C5 (refer to FIG. 7). The duct member 64, being connected to the outlet of the fan 93, as shown in FIG. 3, introduces cooling air sent by a drive of the fan 93 into the inside, and causes the cooling air to circulate to one of the openings 61C3 and 61C4. This kind of duct member 64 is configured including a duct main body 641, and a flow channel switching member 642 disposed inside the duct main body 641.

Among these, the flow channel switching section 642 includes a pair of side surfaces 6421 and 6422 which, being of an approximately triangular shape in a side view, extend in the Y direction and face each other, a pair of bridges 6423 and 6424 which bridge both Y direction extremities of the pair of side surfaces 6421 and 6422, and the air flow guide plate 6425 pivotally supported by the X direction leading extremity side vertices of the pair of side surfaces 6421 and 6422. The air flow guide plate 6425 corresponds to a first air flow guide member in the embodiment of the invention. Also, an approximately rectangular opening 642A surrounded by the pair of side surfaces 6421 and 6422, and the pair of bridges 6423 and 6424, is formed on the X direction proximal extremity side of the flow channel switching member 642, and the mesh M is provided inside the opening 642A.

Pivoting regulation sections 64211 and 64221 which, by the air flow guide plate 6425 pivoting and abutting thereagainst, restrict a pivoting of the air flow guide plate 6425 from exceeding a prescribed amount are formed on the Y direction leading extremity sides and proximal extremity sides, and in approximate centers in the X direction, of the pair of side surfaces 6421 and 6422, in such a way as to extend in the opposite directions to the respective side surfaces 6421 and 6422. Also, clamping sections 64212 and 64222 which, being of an approximate inverted U shape in a side view, are formed by a bending process, are formed on the X direction leading extremity sides of the pair of side surfaces 6421 and 6422. The clamping sections 64212 and 64222, by clamping protrusions 64112 and 64122, to be described hereafter, formed on the duct main body 641 when the flow channel switching member 642 is accommodated in the duct main body 641, stabilize the flow channel switching member 642 inside the duct main body 641.

The duct main body 641, corresponding to a duct section in the embodiment of the invention, includes a pair of side surfaces 6411 and 6412 which, having an approximately trapezoidal shape in a side view, extend in the Y direction, and a pair of connecting sections 6413 and 6414 which connect the X direction proximal extremity sides of the pair of side surfaces 6411 and 6412, and these sections form an intake 641A and an opening 641B on the X direction proximal extremity side and leading extremity side.

Bulges 64111 and 64121 which bulge respectively to the Z direction proximal extremity side and leading extremity side so as to correspond to the previously described expanded section 61C6 are formed in approximate centers of the X direction leading extremities of the pair of side surfaces 6411 and 6412, and protrusions 64112 and 64122 which protrude toward the X direction leading extremity side (toward the flow channel switching member 642) are formed on the duct main body 641 inner surface sides of the bulges 64111 and 64121.

The pair of connecting sections 6413 and 6414 have slopes 64131 and 64141 which, extending from the X direction leading extremity side toward the proximal extremity side, slope in a direction in which the leading extremity portions thereof approximate each other, and extensions 64132 and 64142 which, after extending in the Y direction, which is the direction in which they approximate each other, from the X direction leading extremities of the slopes 64131 and 64141, extend to the X direction proximal extremity sides. The previously described flow channel switching member 642 is accommodated, from the X direction leading extremity, in a space surrounded by the extensions 64132 and 64142, and the pair of side surfaces 6411 and 6412. That is, the pair of extensions 64132 and 64142 abut against the pair of bridges 6423 and 6424 of the flow channel switching member 642 inside the space. Then, at this time, the intake 641A is connected to the opening 642A of the flow channel switching member 642.

Configuration of Lamp Housing Section

Figure 10:
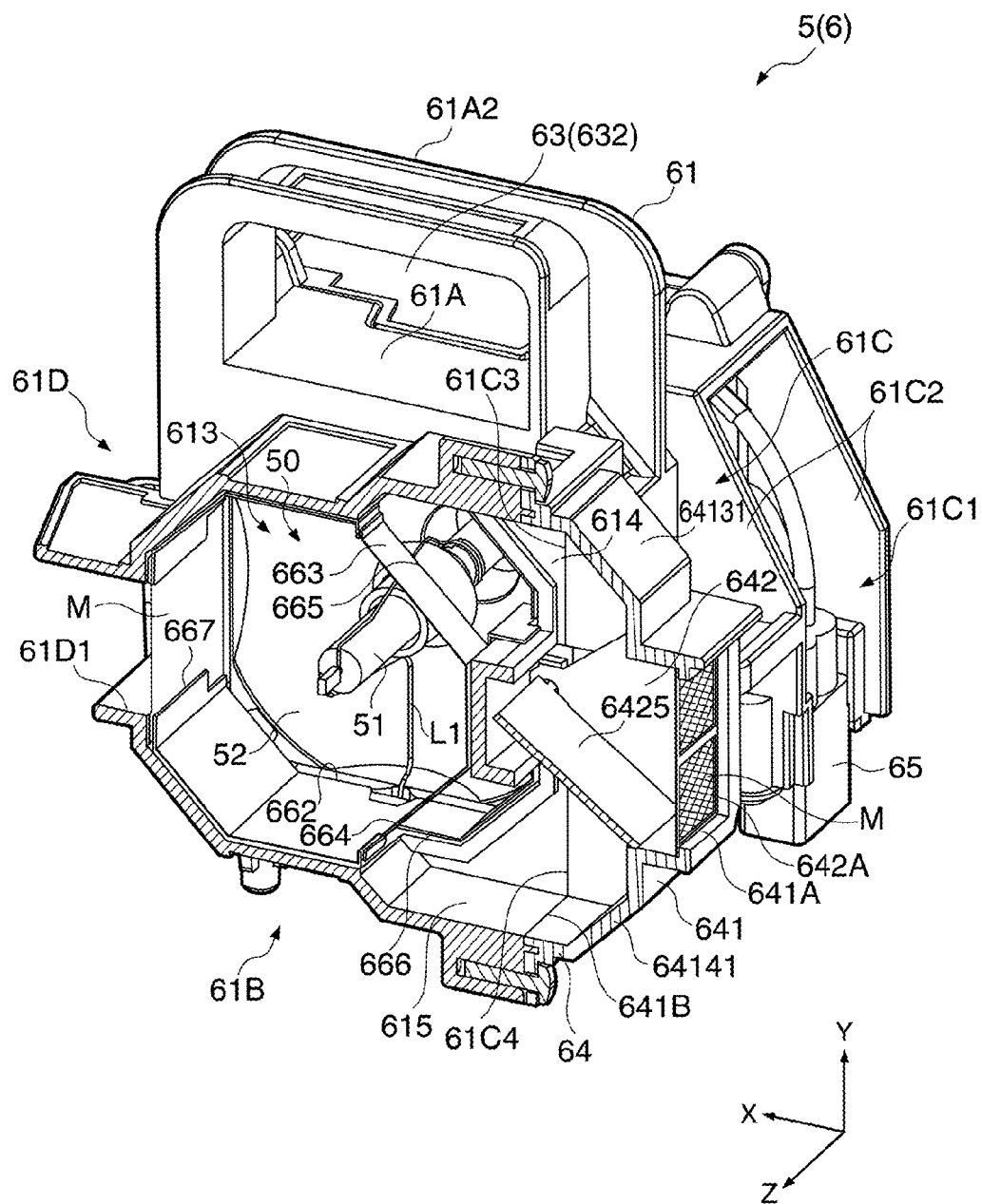
FIG. 10 is a sectional view showing the light source device in the embodiment.
Figure 11:
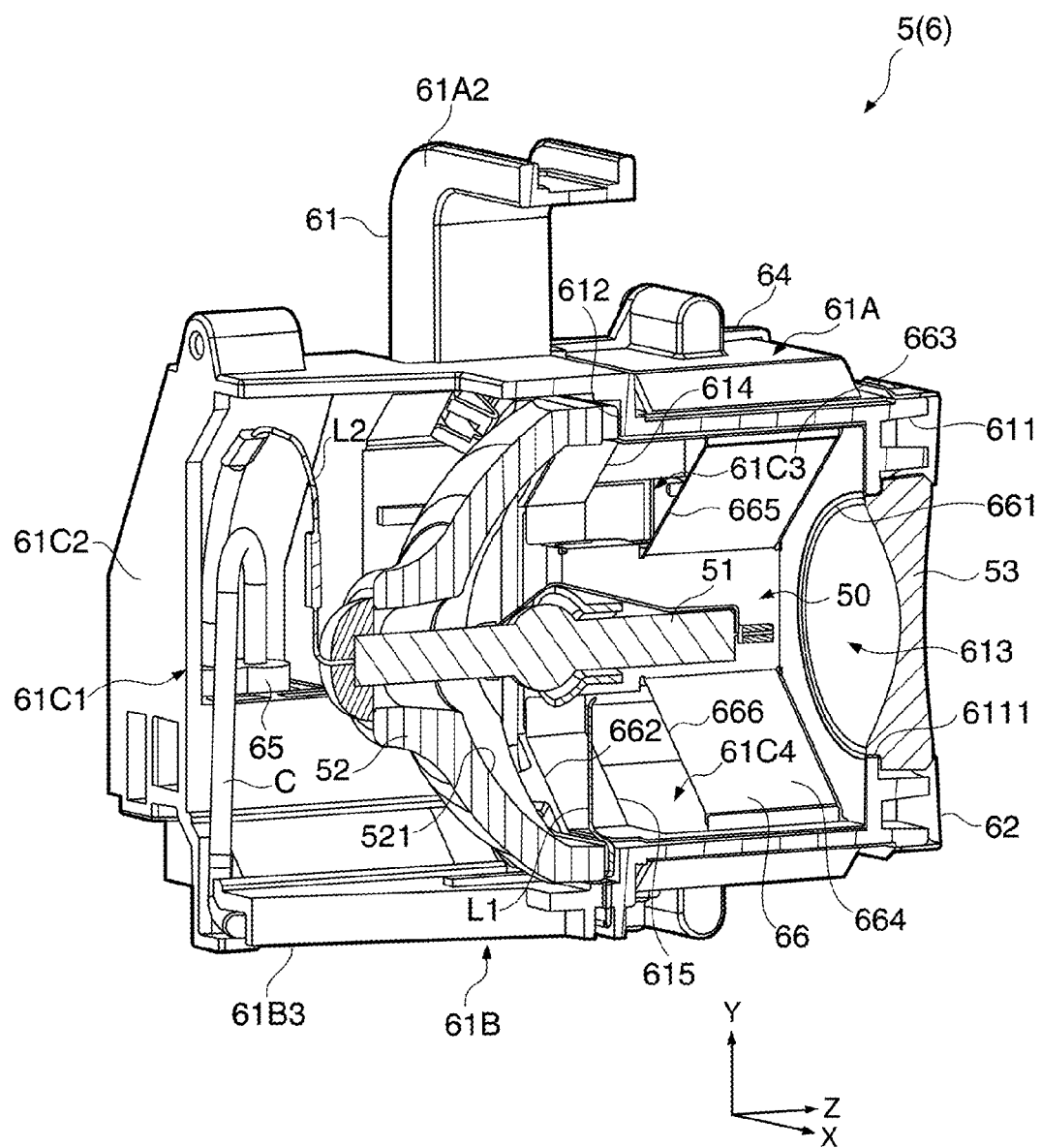
FIG. 11 is a sectional view showing the light source device in the embodiment.

FIGS. 10 and 11 are sectional views showing the light source device 5. Specifically, FIG. 10 is a sectional view of the light source device 5 seen through the center of the intake 641A and in the X direction, while FIG. 11 is a sectional view of the light source device 5 seen through the center of the light source lamp 50 and in the Z direction.

As previously described, the lamp housing section 613 which accommodates the Z direction leading extremity side of the light source lamp 50 is formed inside the housing main body 61. As shown in FIGS. 10 and 11, the lamp housing section 613 is a hollow space formed by being surrounded by the extremity surfaces 61A to 61D of the housing main body 61. Then, the lamp housing section 613 and the openings 61C3 and 61C4 are connected via the duct sections 614 and 615, as previously described.

Apart from the light source lamp 50, a light shielding member 66, which is disposed along the inner surface of the housing main body 61 which forms the lamp housing section 613, is provided in a position inside the lamp housing section 613 which is off the path of light which is emitted from the light emitting tube 51 and reflecting mirror 52, and falls incoming on the image formation regions of the liquid crystal panels 442.

The light shielding member 66 is a tubular metallic member which has an approximately octagonal shape in cross-section taken along an XY plane on the Z direction leading extremity side parallel to the X direction and Y direction, and has an approximately octagonal shape of which the cross-section taken along the XY plane on the Z direction proximal extremity side is wider in the X direction than the cross-section along that on the Z direction leading extremity side. The light shielding member 66 prevents light, among the light emitted from the light emitting tube 51 and reflecting mirror 52, which does not fall incoming on the image formation regions of the liquid crystal panels 442 from falling incoming on the housing main body 61, and deteriorating the housing main body 61.

With this kind of light shielding member 66, as shown in FIG. 11, an approximately circular opening 661 is formed on the Z direction leading extremity side and in a position corresponding to the light transmission opening 6111. As previously described, the opening 661, as well as the light transmission opening 6111, is closed by the collimating concave lens 53. Also, an opening 662 corresponding to the opening 612 of the housing main body 61 is formed on the Z direction proximal extremity side of the light shielding member 66, and the opening 662 is closed by the reflecting mirror 52.

Also, air flow guide sections 663 and 664 acting as second air flow guide members in the embodiment of the invention are formed on the Z direction leading extremity side of the light shielding member 66 and in positions corresponding to the openings 61C3 and 61C4, in such a way as to cover the openings 61C3 and 61C4 from the X direction leading extremity side, as shown in FIGS. 10 and 11. Also, openings 665 and 666 having an approximately trapezoidal shape as seen from the Z direction leading extremity side are formed on the Z direction proximal extremity sides of the air flow guide sections 663 and 664. For this reason, cooling air introduced from the intake 641A of the duct member 64, although details are to be described hereafter, after circulating through the inside of the duct member 64, circulates through one of the openings 61C3 and 61C4 of the housing main body 61, and enters the inside of the lamp housing section 613. At this time, the circulation direction of cooling air is changed to the Z direction proximal extremity side by an air flow guide section corresponding to an opening through which the cooling air circulates, and the cooling air enters the inside of the lamp housing section 613 through an opening formed on the Z direction proximal extremity side of the air flow guide section.

In the light shielding member 66 accommodated in the lamp housing section 613, an opening 667 is formed in a position thereon corresponding to the outlet 61D1, on the side opposite to the air flow guide sections 663 and 664, and the openings 665 and 666, across the light emitting tube 51. The previously described mesh M is provided between the extremity edge of the opening 667 and the extremity edge of the outlet 61D1. Then, the cooling air which has cooled the light emitting tube 51 and reflecting mirror 52, and furthermore, the light shielding member 66, is discharged to the outside of the light source device 5 through the opening 667 and outlet 61D1.

Herein, a description will be given of formation positions of the opening 667 and outlet 61D1.

The outlet 61D1 is formed in an approximately rectangular shape in such a way as to have its center in a position in which a virtual straight line along a perpendicular to the luminous flux emission direction which passes through an approximate center of a virtual straight line connecting the centers of the openings 61C3 and 61C4 of the housing main body 61, and is parallel to the X direction, intersects the extremity surface 61D. Also, the opening 667 of the light shielding member 66 is formed in a position corresponding to the outlet 61D1. For this reason, a flow channel length as far as cooling air introduced through one opening, among the openings 61C3 and 61C4, positioned on the upper side is discharged through the outlet 61D1 is approximately the same as a flow channel length as far as cooling air introduced through the other opening positioned on the upper side by the light source device 5 being disposed upside down is discharged through the outlet 61D1.

Flow Channel of Cooling Air in Normal Position

Figure 12:
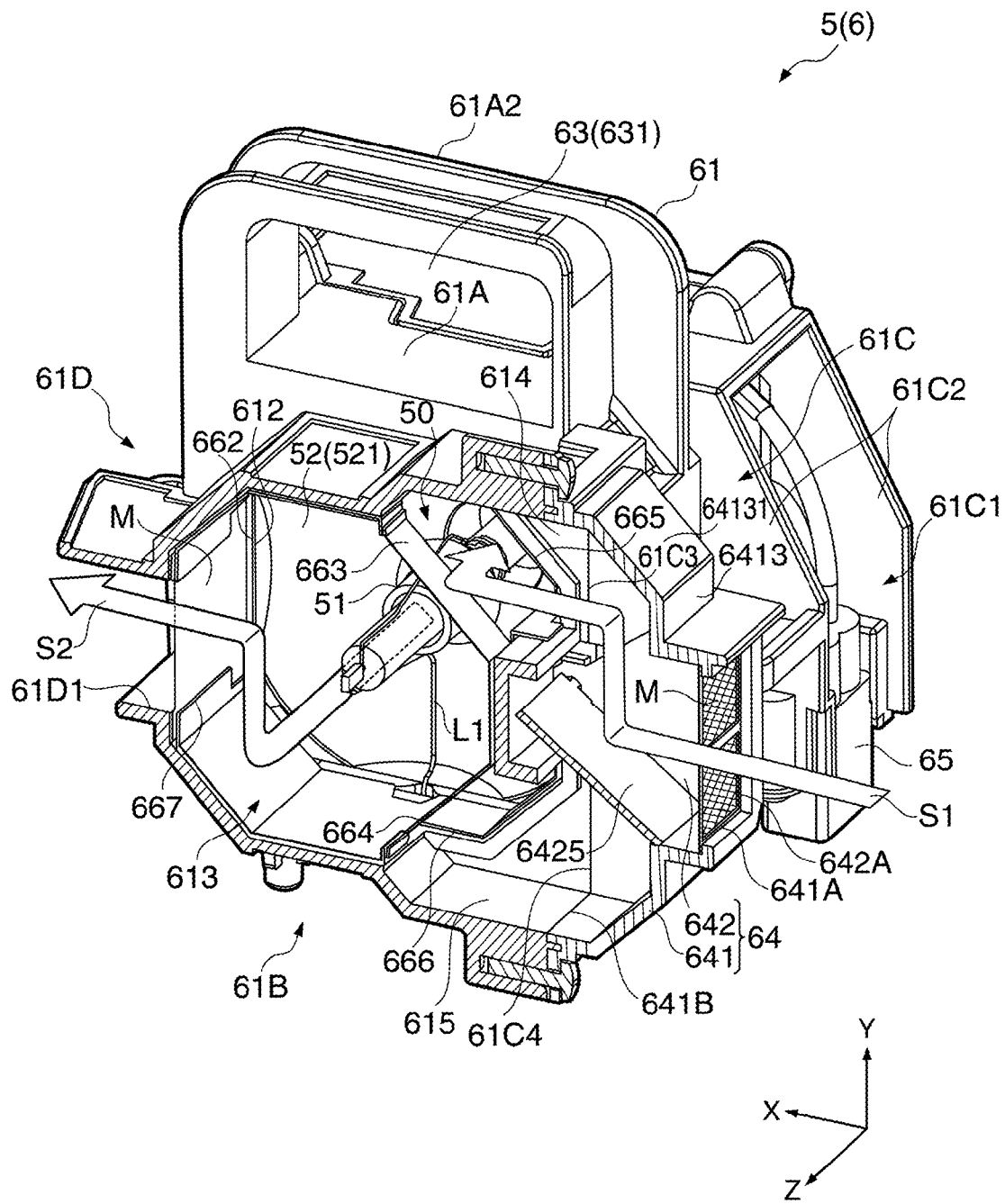
FIG. 12 shows a cooling flow channel of the light source device in a normal position in the embodiment.
Figure 13:
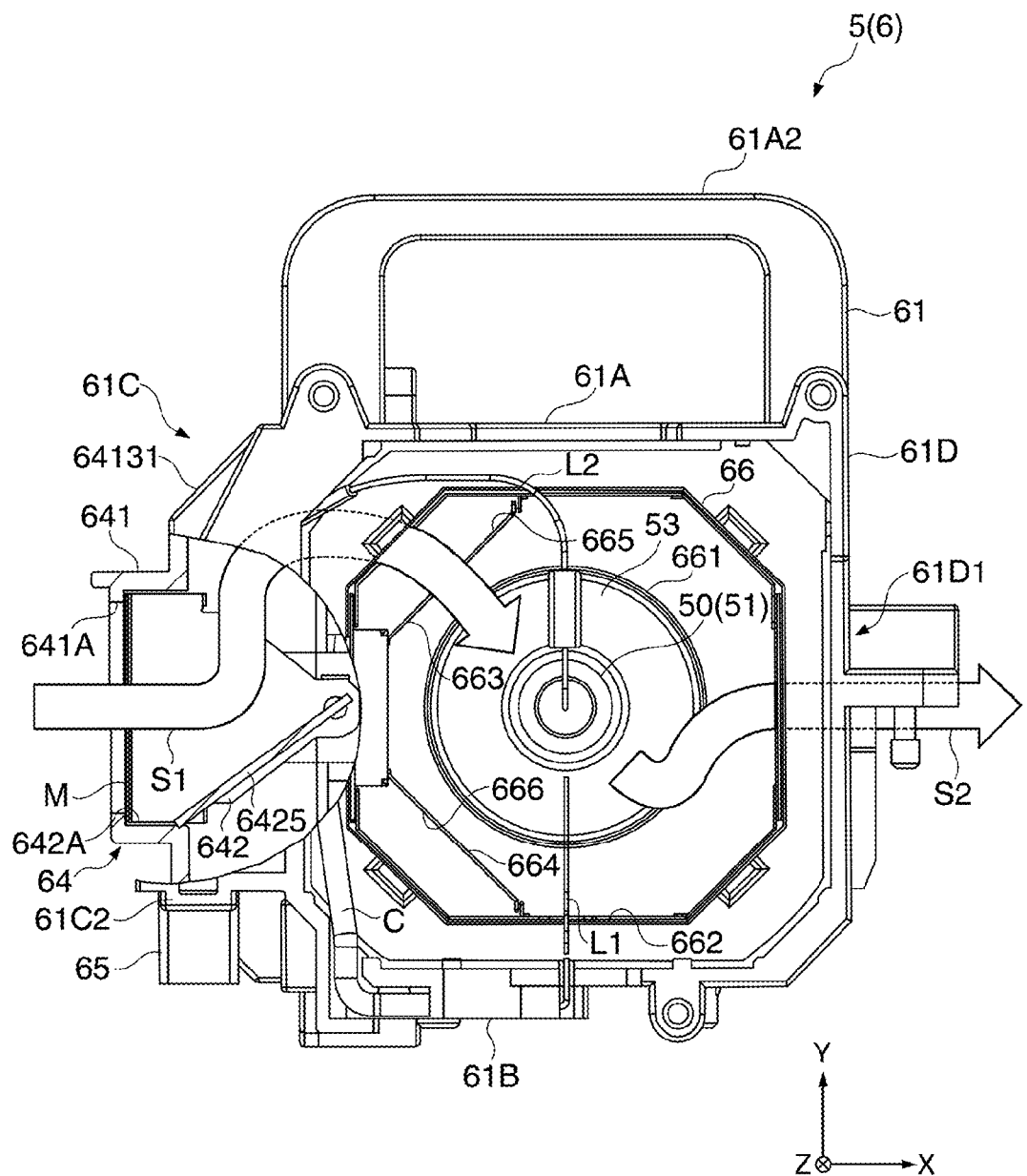
FIG. 13 shows a cooling flow channel of the light source device in the normal position in the embodiment.
Figure 14:
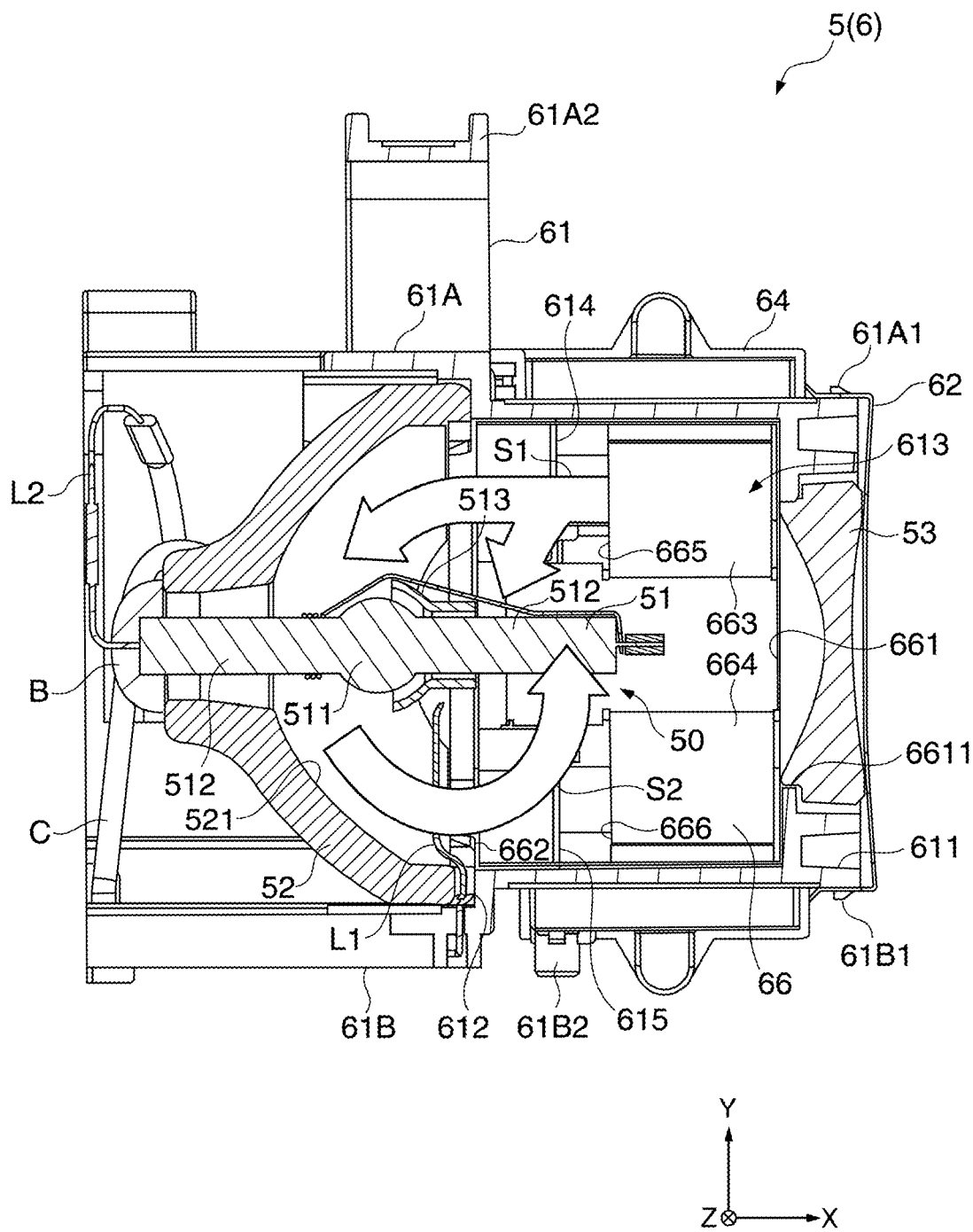
FIG. 14 shows a cooling flow channel of the light source device in the normal position in the embodiment.

FIGS. 12 to 14 show a flow channel of cooling air which cools the light source lamp 50 in a case in which the projector 1 is in a normal position. Specifically, FIG. 12 shows a flow channel of cooling air when viewed from the same position as that of FIG. 10, FIG. 13 shows a flow channel of cooling air when viewed from the Z direction proximal extremity side, and FIG. 14 shows a flow channel of cooling air when viewing the inside of the light source device 5 from the X direction leading extremity side. In FIG. 13, the illustration of the reflecting mirror 52 and second cover 63 is omitted, and also, in FIG. 14, the illustration of the second cover 63 is omitted.

Hereafter, a description will be given of a flow channel of cooling air circulating inside the light source device 5 in a case in which the Y direction leading extremity side is made the upper side, that is, in the case in which the projector 1 is in the normal position.

As shown in FIGS. 12 and 13, a flow channel S1 through which cooling air sent out by the fan 93 is introduced into the light source device 5, and a flow channel S2 through which cooling air which has cooled the light source lamp 50 is discharged, are formed inside the light source device 5.

Specifically, with the flow channel S1, the cooling air sent out by the fan 93 is introduced into the duct main body 64 through the intake 641A, mesh M, and opening 642A of the duct member 64 which are disposed facing the outlet of the fan 93.

Herein, as a flow channel directed toward the opening 61C4 is closed by the air flow guide plate 6425 which has pivoted downward under its own weight, the cooling air introduced into the duct main body 641, after circulating along the slope 64131 and toward the opening 61C3, enters the inside of the lamp housing section 613 through the opening 61C3, the duct section 614, and the opening 665 of the light shielding member 66.

At this time, as the air flow guide section 663 of the light shielding member 66 is positioned inside the lamp housing section 613 in such a way as to face the opening 61C3, as previously described, the circulation direction of cooling air is changed by the air flow guide section 663, and the cooling air enters the inside of the lamp housing section 613 through the opening 665 formed on the Z direction leading extremity side of the air flow guide section 663.

As shown in FIG. 14, one portion of the cooling air which has entered the inside of the lamp housing section 613 circulates downward along the reflecting surface 521 of the reflecting mirror 52 formed in the approximately concave shape in cross-section, and cools the reflecting mirror 52 and the light emitting tube 51 (mainly the light emitting section 511 and a sealing section 512 on the Z direction proximal extremity side) fixed to an approximate center of the reflecting surface 521 with an adhesive B. Also, as the air flow guide sections 663 and 664 do not cover all of the openings 61C3 and 61C4, as seen from the X direction side, one portion of the cooling air which has circulated via the opening 61C3 circulates downward from the opening 665, and cools a sealing section 512 on the Z direction leading extremity side.

Herein, the light emitting tube 51 includes the approximately spherical light emitting section 511, inside which a pair of electrodes are disposed, and a discharge between the electrodes causes a light emitting material enclosed therewithin to emit light, and the pair of sealing sections 512, which extend in opposite directions away from the light emitting section 511 (to the Z direction leading extremity side and proximal extremity side), and through the inside of which are inserted the lead wires L1 and L2 connected to the electrodes. Also, the light emitting tube 51 is provided with an approximately bowl-shaped sub-reflecting mirror 513 which covers the Z direction leading extremity side of the light emitting section 511. The sub-reflecting mirror 513, being configured of a cold mirror, reflects light, among the light emitted from the light emitting section 511, emitted to the Z direction leading extremity side to the reflecting mirror 52 side. Light which, in the event that the sub-reflecting mirror 513 is not provided, does not fall incoming on the collimating concave lens 53, and is not superimposed on the image formation regions of the liquid crystal panels 442, is utilized by being reflected toward the reflecting mirror 52 by this kind of sub-reflecting mirror 513, thereby increasing the use efficiency of the light emitted from the light emitting tube 51.

Meanwhile, as this kind of sub-reflecting mirror 513 covers the Z direction leading extremity side of the light emitting section 511, even in the event of attempting to cool the light emitting section 511 by applying cooling air directly to it from the Z direction leading extremity side, the cooling air is blocked by the sub-reflecting mirror 513, reducing the cooling efficiency of the light emitting section 511. In response to this, one portion of cooling air, the flow of which has been rectified by the air flow guide section 663, flows along the reflecting surface 521 of the reflecting mirror 52, and circulates downward from behind the light emitting section 511, thereby cooling the light emitting section 511. Consequently, it is possible to efficiently cool the light emitting section 511 even in the event that the sub-reflecting mirror 513 is attached.

Then, with this kind of light emitting tube 51, as cooling air circulates downward from above, the light emitting section 511 is cooled from above. For this reason, as it is possible to suppress an excessive increase of temperature on the upper side of the light emitting section 511, it is possible to prevent an occurrence of a white turbidity, deformation, or the like of glass configuring the light emitting section 511. Also, contrarily, as it is possible to suppress an excessive reduction of temperature on the lower side of the light emitting section 511, it is possible to suppress a change occurring in the inner environment of the light emitting section 511, and thus achieve a longer life of the light emitting tube 51. Also, as cooling air flows over not only the light emitting tube 51, but also the reflecting mirror 52, it is possible to achieve a longer life of the whole of the light source lamp 50.

With the flow channel S2, as shown in FIGS. 12 and 13, cooling air inside the lamp housing section 613 is taken in by the fan 94 disposed facing the outlet 61D1, through the opening 667 of the light shielding member 66, the mesh M, and the outlet 61D1, and discharged to the outside of the light source device 5. At this time, the cooling air which has cooled the light emitting tube 51, after circulating along the lower side of the reflecting surface 521, as shown in FIG. 14, circulates toward the opening 667, and is discharged.

Channel of Cooling Air in Suspended Position

Figure 15:
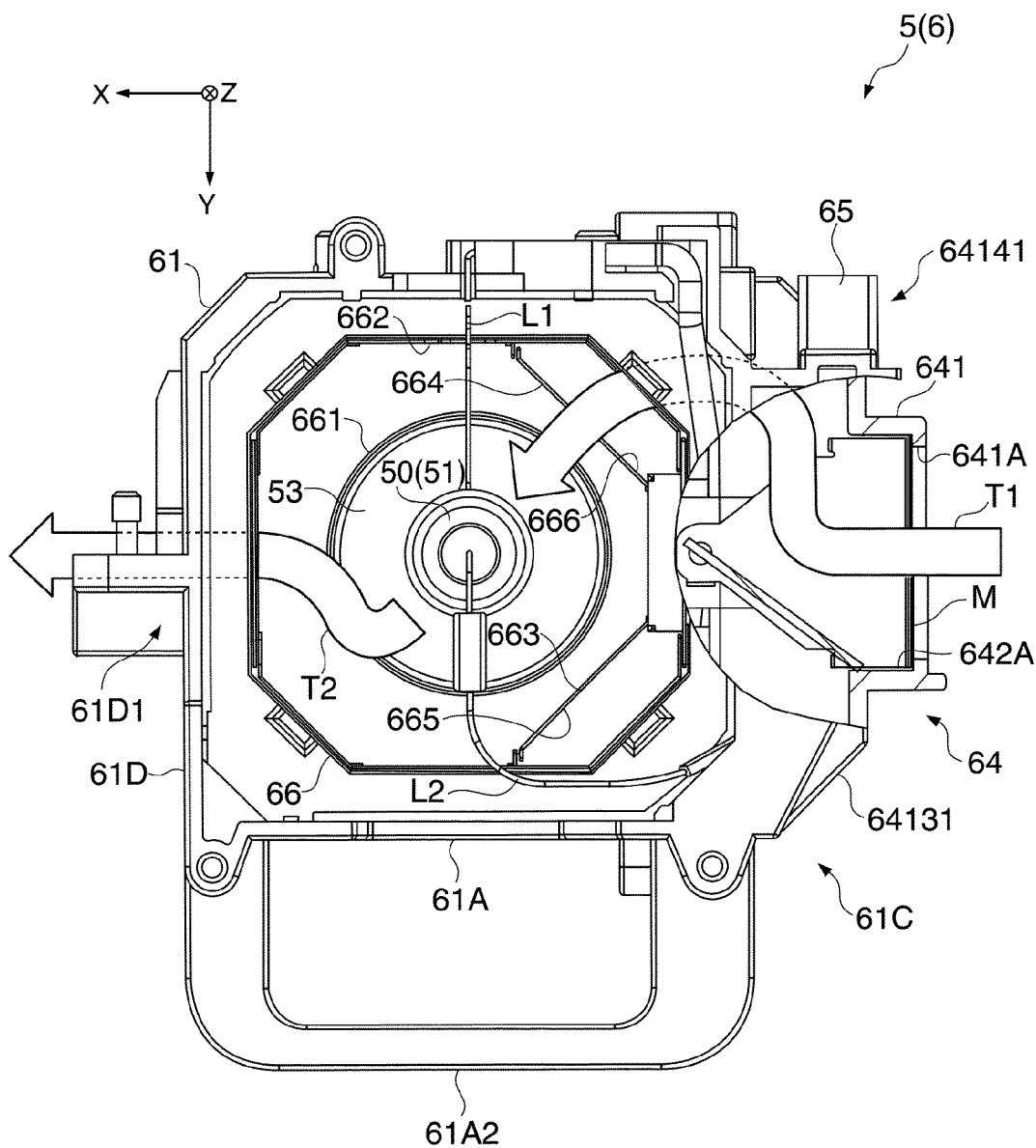
FIG. 15 shows a cooling flow channel of the light source device in a suspended position in the embodiment.
Figure 16:
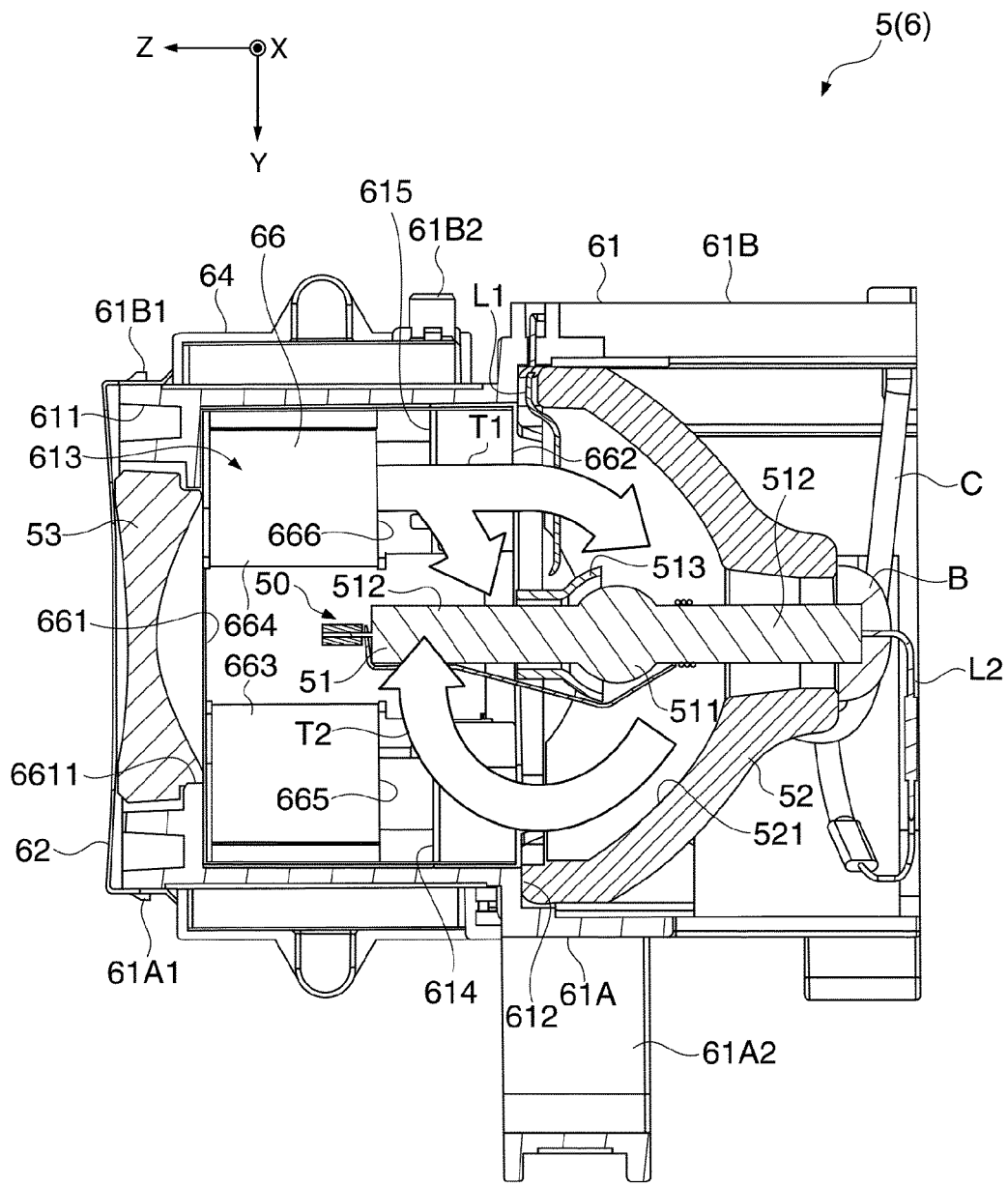
FIG. 16 shows a cooling flow channel of the light source device in the suspended position in the embodiment.

FIGS. 15 and 16 show a flow channel of cooling air which cools the light source lamp 50 in the case in which the projector 1 is in the suspended position. In other words, FIGS. 15 and 16 show a flow channel of cooling air when viewing the inside of the light source device 5 from the Z direction proximal extremity side and the X direction leading extremity side. In FIG. 15, the illustration of the second cover 63 is omitted.

In the light source device 5 in a case in which the Y direction leading extremity side is made the lower side, that is, in the case in which the projector 1 is in the suspended position, cooling air circulates along flow channels T1 and T2, which are an inversion of the heretofore described case, and cools the light emitting tube 51 and reflecting mirror 52.

Specifically, as shown in FIG. 15, in the case in which the projector 1 is in the suspended position, the air flow guide plate 6425 inside the duct member 64 pivots downward under its own weight. For this reason, with the flow channel T1 which is a cooling air introduction system, cooling air introduced from the intake 641A, the circulation thereof to the opening 61C3 side being regulated by the air flow guide plate 6425, after entering the inside of the duct main body 641, flows into the lamp housing section 613 through the opening 61C4, the duct section 615, and the opening 666 of the light shielding member 66. Subsequently, as shown in FIG. 16, one portion of the cooling air which has flown into the lamp housing section 613 circulates downward from above along the reflecting surface 521 of the reflecting mirror 52, and cools the light emitting tube 51 (mainly the light emitting section 511 and the Z direction proximal extremity side sealing section 512) from above, as previously described, and also, the other portion circulates downward from the opening 666, and cools the Z direction leading extremity side sealing section 512.

Then, with the flow channel T2 which is a cooling air discharge system, cooling air supplied to cool the light emitting tube 51 and reflecting mirror 52 is taken in by the fan 94 and, as shown in FIG. 15, discharged to the outside of the light source device 5 through the outlet 61D1.

According to the projector 1 of the heretofore described embodiment, there are the following advantages.

1. The air flow guide plate 6425 of the duct member 64 attached in such a way as to cover the pair of openings 61C3 and 61C4 switches the flow channel of cooling air which cools the light source lamp 50 to the side of an opening positioned on the upper side. As this kind of air flow guide plate 6425 switches the flow channel of cooling air under its own weight, it is not necessary to provide a detection unit which detects a position of the projector 1 and thus the light source device 5, or a pivoting unit such as a motor which pivots the air flow guide plate 6425 according to the position detected. Consequently, as it is possible to cause cooling air to circulate to the opening positioned on the upper side regardless of whether the projector 1 is in the normal position or in the suspended position, it is possible to efficiently cool the light source lamp 50 with a simple configuration. Also, as it is possible to achieve a longer life of the light source lamp 50, it is possible to reduce the frequency of replacement of the light source device 5, and thus eliminate the trouble of maintaining the projector 1.

2. As the air flow guide plate 6425 pivots under its own weight, leading cooling air to an opening, among the pair of openings 61C3 and 61C4, positioned on the upper side, it is possible to cool the light emitting tube 51 from above. Consequently, as it is possible to efficiently cool the upper side of the light emitting section 511, it is possible to more efficiently cool the light emitting tube 51, and thus suppress a deterioration of the light emitting tube 51.

3. The outlet 61D1 is formed on the side opposite from the pair of openings 61C3 and 61C4 across the light emitting tube 51. To describe in detail, as the outlet 61D1 has its center on the virtual straight line along a perpendicular to the luminous flux emission direction which passes through the approximate center of the virtual straight line connecting the centers of the pair of openings 61C3 and 61C4, the flow channels of cooling air from the openings 61C3 and 61C4 to the outlet 61D1 have approximately the same length whichever of the openings 61C3 and 61C4 is utilized. Consequently, as the outlet 61D1 is formed on the side opposite from the openings 61C3 and 61C4 across the light emitting tube 51, as well as it being possible to reliably send cooling air to the light emitting tube 51, it is possible to send cooling air to the light emitting tube 51 in the same way whichever of the openings 61C3 and 61C4 is positioned on the upper side.

4. Cooling air introduced from the openings 61C3 and 61C4 circulates toward the light emitting tube 51 and reflecting mirror 52 by means of the air flow guide sections 663 and 664 provided inside the lamp housing section 613 in such a way as to correspond to the openings 61C3 and 61C4. According to this configuration, it is possible to reliably and appropriately send cooling air to the light source lamp 50. Consequently, it is possible to more efficiently cool the light source lamp 50.

5. The metallic light shielding member 66 which is disposed along the inner surface of the housing main body 61 forming the lamp housing section 613, and shields light falling incoming on the housing main body 61, is provided inside the lamp housing section 613. According to this configuration, as it is possible to prevent the light from falling incoming on the housing main body 61, as well as it being possible to suppress a deterioration of the housing main body 61, it is possible to suppress the adhesion of a glass filler to the reflecting surface 521. Consequently, it being possible to suppress a reduction in light reflection efficiency of the reflecting surface 521, it is possible to suppress a reduction in use efficiency of light from the light source lamp 50. Also, as it is possible to suppress a deterioration of the housing main body 61, it is possible to improve the degree of freedom in selecting a material of the housing main body 61. Furthermore, by forming the air flow guide sections 663 and 664 in this kind of light shielding member 66, it is possible to suppress an unnecessary increase in the number of parts of the light source device 5.

MODIFICATIONS OF EMBODIMENT

The invention not being limited to the previously described embodiment, modifications, improvements, and the like are included in the invention without departing from the scope of the invention.

With the previously described embodiment, an arrangement is such that the air flow guide plate 6425 acting as the air flow guide member, in the normally positioned condition of the projector 1, causes cooling air to circulate to the opening 61C3 positioned on the upper side and, in the suspended condition, causes cooling air to circulate to the opening 61C4 positioned on the upper side, but the invention is not limited to this. That is, it is also acceptable to configure in such a way that the air flow guide plate 6425 causes cooling air to circulate to the opening positioned on the lower side whichever installation position the projector 1 is in.

With the previously described embodiment, an arrangement is such that the outlet 61D1 through which air inside the lamp housing section 613 is discharged is formed on the side opposite from the pair of openings 61C3 and 61C4 of the housing main body 61 across the light emitting tube 51, but the invention is not limited to this. That is, the position of the outlet 61D1 is no object as long as it is possible to appropriately discharge cooling air which has cooled the light emitting tube 51.

With the previously described embodiment, an arrangement is such that, the light shielding member 66 being provided inside the lamp housing section 613, the air flow guide sections 663 and 664 which cause cooling air introduced from the openings 61C3 and 61C4 to circulate to the Z direction proximal extremity side are formed, and the openings 665 and 666 through which the cooling air is sent to the light emitting tube 51 are formed, in the positions corresponding to the openings 61C3 and 61C4 of the light shielding member 66, but the invention is not limited to this. That is, it is also acceptable to configure in such a way as to provide air flow guide members functioning as the air flow guide sections 663 and 664, separately from the light shielding member 66. Also, as long as the light emitting tube 51 is disposed in such a way as to face the openings 61C3 and 61C4, it is also acceptable to eliminate these kinds of air flow guide section 663 and 664. Furthermore, in the event that the housing 6 is formed of a metal, it is also acceptable not to provide the light shielding member 66.

With the previously described embodiment, an arrangement is such that the projector 1 includes the three liquid crystal panels 442R, 442G, and 442B, but the invention is not limited to this. That is, the invention is also applicable to a projector using two or less, or four or more liquid crystal panels.

With the previously described embodiment, a description is given of a configuration such that the optical unit 4 has an approximate L shape in a plan view but, the invention not being limited to this, it is also acceptable to employ a configuration such that it has, for example, an approximate U shape in a plan view.

With the previously described embodiment, the transmissive liquid crystal panels 442 are used of which the luminous flux incoming surfaces and luminous flux exiting surfaces are different, but it is also acceptable to use reflective liquid crystal panels of which the light incoming surfaces and light exiting surfaces are identical, and it is also acceptable to employ light modulation devices using other than liquid crystal, such as devices using micromirrors.

With the previously described embodiment, the light source device 5 is adopted for the projector 1 but, the invention not being limited to this, it is also acceptable to employ other electronic instruments such as an illumination device.

The invention can be utilized for a light source device, and particularly, can be suitably utilized for a light source device adopted for a projector.

What is claimed is:

1. A light source device comprising:
   a light source lamp configured to emit light; and
   a housing which accommodates therein the light source lamp, wherein the housing includes:
      a pair of openings formed, along a top and bottom with direction of a luminous flux emission of the light source device;
      a duct member provided so as to cover the pair of openings, and having an intake through which outside air is introduced from the pair of openings to an air flow channel upstream side;
      a first air flow guide member provided inside the duct member, the first air flow guide member causing the air introduced from the intake to circulate to either one or the other of the pair of openings via the duct member, the first flow guide member being pivotable under its own weight between a first position and a second position, wherein:
         when the first flow guide member is in the first position, the air introduced from the intake is directed toward a first opening of the pair of openings and away from a second opening of the pair of openings, and
         when the first flow guide member is in the second position, the air introduced from the intake is directed toward the second opening of the pair of openings and away from the first opening of the pair of openings; and
      a pair of second air flow guide members provided in positions in the housing corresponding to each of the pair of openings, each of the pair of second air flow guides causing the air introduced from the corresponding opening to circulate toward the light source lamp.

2. The light source device according to claim 1, wherein the first air flow guide member leads the air introduced from the intake to the one of the pair of openings which is positioned on the upper side.

3. The light source device according to claim 1, wherein the housing includes an outlet formed on the side opposite from the pair of openings across the light source lamp, and discharges air which has cooled the light source lamp, and
the center of the outlet being provided on a virtual straight line along a perpendicular to the luminous flux emission direction which passes through an approximate center of a virtual straight line connecting the centers of the pair of openings.

4. The light source device according to claim 1, wherein the second air flow guide members are provided along the inner surface of the housing, and have a light shielding effect which shields incoming light on the inner surface among the light emitted from the light source lamp.

5. A projector comprising:
   the light source device according to claim 1;
   a light modulation device configured to modulate a luminous flux emitted from the light source device; and
   a projection optical device configured to project the modulated luminous flux.

6. The projector according to claim 5, wherein the first air flow guide member leads the air introduced from the intake to the one of the pair of openings which is positioned on the upper side.

7. The projector according to claim 5, wherein the housing includes an outlet which, being formed on the side opposite from the pair of openings across the light source lamp, and discharges air which has cooled the light source lamp, and
the center of the outlet being provided on a virtual straight line along a perpendicular to the luminous flux emission direction which passes through an approximate center of a virtual straight line connecting the centers of the pair of openings.

8. The projector according to claim 5, wherein the second air flow guide members are provided along the inner surface of the housing, and have a light shielding effect which shields incoming light on the inner surface among the light emitted from the light source lamp.

* * * * *